(12) United States Patent
Tew et al.

(10) Patent No.: US 9,074,098 B2
(45) Date of Patent: Jul. 7, 2015

(54) TELECHELIC BASED NETWORKS FROM NOVEL MACROMONOMERS, COMPOSITIONS, PREPARATION AND USES THEREOF

(71) Applicant: University of Massachusetts, Boston, MA (US)

(72) Inventors: Gregory N. Tew, South Deerfield, MA (US); Melissa A. Lackey, Sunderland, MA (US); Jun Cui, Amherst, MA (US); Catherine N. Walker, South Deerfield, MA (US); Alfred J. Crosby, Amherst, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 14/190,396

(22) Filed: Feb. 26, 2014

(65) Prior Publication Data
US 2014/0296425 A1    Oct. 2, 2014

Related U.S. Application Data

(60) Provisional application No. 61/769,335, filed on Feb. 26, 2013.

(51) Int. Cl.
| | | |
|---|---|---|
| *C08G 77/20* | (2006.01) | |
| *C08G 65/00* | (2006.01) | |
| *C08L 83/12* | (2006.01) | |
| *C08G 81/00* | (2006.01) | |
| *C08G 77/46* | (2006.01) | |
| *C08L 87/00* | (2006.01) | |

(52) U.S. Cl.
CPC .................. *C08L 83/12* (2013.01); *C08G 81/00* (2013.01); *C08G 77/20* (2013.01); *C08G 77/46* (2013.01); *C08G 65/002* (2013.01); *C08L 87/005* (2013.01)

(58) Field of Classification Search
None
See application file for complete search history.

(56) References Cited

U.S. PATENT DOCUMENTS

| 2003/0097015 A1* | 5/2003 | Heldmann et al. ............ 556/469 |
| 2010/0209468 A1* | 8/2010 | Kennedy et al. ............. 424/422 |

OTHER PUBLICATIONS

"Mechanical Properties of End-Linked PEG/PDMS Hydrogels" authored by Cui et al. and published in Macromolecules (2012) 45, 6104-6110.*
"Synthetically Simple, Highly Resilient Hydrogels" authored by Cui et al. and published in Biomacromolecules (2012) 13, 584-588.*
"Contribution Toward Comprehension of Contact Angle Values on Single Polydimethylsiloxane and Poly(ethylene oxide) Polymer Networks" Langmuir (2006) 26 (22), 17427-17434.*

* cited by examiner

*Primary Examiner* — Marc Zimmer
(74) *Attorney, Agent, or Firm* — Milstein Zhang & Wu LLC

(57) ABSTRACT

The invention provides highly resilient synthetic hydrogels, which can be prepared, for example, by using the efficient thiol-norbornene chemistry to cross-link hydrophilic poly(ethylene glycol) (PEG) and hydrophobic polydimethylsiloxane (PDMS) polymer chains. The simple hydrogel system with enhanced mechanical properties is useful in many applications, including in the biomedical field and in the design of protective and corrective wear.

15 Claims, 43 Drawing Sheets

US 9,074,098 B2

TELECHELIC BASED NETWORKS FROM NOVEL MACROMONOMERS, COMPOSITIONS, PREPARATION AND USES THEREOF

PRIORITY CLAIMS AND RELATED APPLICATIONS

This application claims the benefit of U.S. Provisional Application No. 61/769,335, filed Feb. 26, 2013, the entire content of which is incorporated herein by reference in its entirety.

GOVERNMENT RIGHTS

The United States Government has certain rights to the invention pursuant to Grant No. N00014-10-1-0348 from The Office of Naval Research to the University of Massachusetts.

TECHNICAL FIELD OF THE INVENTION

The invention generally relates to macromolecules and macromolecule networks. More particularly, the invention relates to novel macromonomers, telechelic-based macromolecular networks, and their compositions and methods of preparation and uses.

BACKGROUND OF THE INVENTION

Synthetic hydrogels, cross-linked materials that typically consist of more than 50% water, are notoriously brittle and have poor mechanical properties, including low strain to break and toughness and high stress-strain hysteresis. (Tanaka, et al. 2005 *Progress in Polymer Science* 30, (1), 1-9; Calvert 2009 *Advanced Materials* 21, (7), 743-756.) In contrast, biological materials often have robust mechanical properties in the hydrated state, such as the rubber-like proteins that can be deformed to high degrees of strain without failing. (Gosline, et al. 2002 *Philosophical Transactions of the Royal Society of London Series B-Biological Sciences* 357, (1418), 121-132; Munch, et al. 2008 *Science* 322, (5907), 1516-1520.) The proteins elastin and resilin are both water swollen (40-60%) yet have the remarkable ability to undergo significant reversible deformation with no energy loss, also known as having high resilience. Nature appears to exploit this property for mechanical energy storage that facilitates movement.

Resilin, which is even more resilient than elastin, hence its name, serves a variety of purposes, from being involved in the jumping mechanism in fleas to the flight system of dragonflies and the sound producing organs of the locust. (Gosline 1987 *Rubber Chemistry and Technology* 60, (3), 417-438.) First investigated by Weis-Fogh in the 1960s in the form of the dragonfly tendon, it was shown to be 92-97% resilient, which is greater than polybutadiene rubber (80%), perhaps the most prototypical synthetic elastomer. (Weis-Fogh 1960 *Journal of Experimental Biology* 37, (4), 889-907; Elvin, et al. 2005 *Nature* 437, (7061), 999-1002.) Studies on the structure of resilin have shown that the cross-linking chemistry is highly specific, occurring only through the tyrosine units, with approximately 40 to 60 amino acid residues (~4 to 7 kDa) between junctions.8 In addition, resilin is an amorphous material, with no stable secondary structures within the crosslinked primary chains. (Elliott, et al. 1965 *Journal of Molecular Biology* 13, (3), 791-795; Weis-Fogh 1961 *Journal of Molecular Biology* 3, (5), 648-667.) It is this uniform network (narrowly defined molecular weight between crosslinks as well as robust cross-linking chemistry), low crosslink density, and absence of secondary structure within the primary chains that are thought to be responsible for the remarkable elastomeric properties of resilin.

In recent years, recombinant protein methods have been used to prepare elastic protein materials similar to elastin and resilin with reasonable success. (Elvin, et al. 2005 *Nature* 437, (7061), 999-1002; Li, et al. 2011 *Biomacromolecules* 12, (6), 2302-2310.) Cross-linked recombinant rec1-resilin, with an equilibrium water content of approximately 80%, was found to have a modulus of 2.5 kPa and could be stretched to 300% of its original length with negligible hysteresis upon removal of the load (resilience of 97%). (Elvin, et al. 2005 *Nature* 437, (7061), 999-1002.) Resilin-like polypeptide (RLP)-based elastomers with biologically active domains were also synthesized through a recombinant modular approach by Charati and coworkers. (Charati, et al. 2009 *Soft Matter* 5, (18), 3412-3416.) When hydrated, these materials had a water content of 85% and a Young's modulus (in tension) of 30-60 kPa. Further work on these hydrogels demonstrated that their properties could be tuned while maintaining a high resilience (>90%), even when extended to 200% strain. (Li, et al. 2011 *Biomacromolecules* 12, (6), 2302-2310; Charati, et al. 2009 *Soft Matter* 5, (18), 3412-3416.)

Nevertheless, these materials are protein-based. At the same time, a number of approaches have been employed to improve the mechanical properties of non protein-based synthetic hydrogels, often in an effort to match the performance of natural tissues. (Guan, et al. 2004 *Journal of the American Chemical Society* 126, (7), 2058-2065; Chen, et al. 2010 *Journal of the American Chemical Society* 132, (13), 4577-4579.) However, there has been significantly less progress toward the creation of materials with resilience similar to resilin. One reason for this is that many conventional crosslinking methods create inhomogeneous network structures with defects such as loops and dangling chains. (Malkoch, et al. 2006 *Chemical Communications* (26), 2774-2776.)

Efforts to improve the mechanical performance of hydrogels have involved the manipulation of network microstructures, as seen in nanocomposite, block copolymer, and double network (DN) gels, and the use of amphiphilic systems, where the hydrophobic component influenced the water content and mechanical properties. (Tanaka, et al. 2005 *Progress in Polymer Science* 30, (1), 1-9; Xiao, et al. 2010 *Soft Matter* 6, (21), 5293-5297; Johnson, et al. 2010 *Progress in Polymer Science* 35, (3), 332-337; Zhu, et al. 2006 *Macromolecular Rapid Communications* 27, (13), 1023-1028; Webber, et al. 2007 *Macromolecules* 40, (8), 2919-2927; Hou, et al. 2010 *Biomacromolecules* 11, (3), 648-56; Guo, et al. 2010 *Soft Matter* 6, (19), 4807-4818; Mespouille, et al. 2009 *Soft Matter* 5, (24), 4878-4892; Erdodi, et al. 2006 *Progress in Polymer Science* 31, (1), 1-18.) Studies on DN gels composed of a rigid highly cross-linked poly(2-acrylamido-2-methylpropanesulfonic acid) (PAMPS) first network and a loosely cross-linked polyacrylamide (PAAm) second network have shown that these gels have a high tensile strength and toughness, but exhibit considerable hysteresis after just one loading cycle. (Webber, et al. 2007 *Macromolecules* 40, (8), 2919-2927.) Similar large hysteresis loops have been observed for other gels, such as triblock copolymer gels, hybrid hydrogels, and hydrophobically functionalized polyelectrolyte hydrogels. (Seitz, et al. 2009 *Soft Matter* 5, (2), 447-456; Lin, et al. 2010 *Macromolecules* 43, (5), 2554-2563; Miquelard-Garnier, et al. 2008 *Soft Matter* 4, (5), 1011-1023.)

Many current synthetic hydrogels with seemingly attractive mechanical properties are of limited practical use when resilience is required, as one instance of loading to high strain results in permanent deformation or fracture and irreversibly changes the material properties. Other efforts have included end-linking reactions, such as Michael-type additions and click chemistry, to synthesize well-defined network structures. (Malkoch, et al. 2006 *Chemical Communications* (26), 2774-2776; Lutolf, et al. 2003 *Biomacromolecules* 4, (3), 713-722; Gupta, et al. 2010 *Nat Chem* 2 (2), 138-45.) However, the mechanical performance of such networks has not been systematically investigated. In 2008, Sakai and coworkers reported a homogeneous gel formed by cross-linking symmetrical tetrahedron-like poly-(ethylene glycol) (PEG) macromonomers that were designed to minimize entanglements. (Sakai, et al. 2008 *Macromolecules* 41, (14), 5379-5384.) This design strategy was an effective way to improve the elastic properties of the materials; however, to date, this chemistry has been limited to PEG. (Sakai, et al. 2010 *Macromol Rapid Commun* 31, (22), 1954-9; Fukasawa, et al. 2010 *Macromolecules* 43, (9), 4370-4378.)

Thus, an ongoing need exists for highly resilient synthetic hydrogels with tunable properties.

SUMMARY OF THE INVENTION

The invention provides highly resilient synthetic hydrogels, which can be prepared by using the efficient thiol-norbornene chemistry to cross-link hydrophilic PEG and hydrophobic PDMS polymer chains. The simple hydrogel systems with enhanced mechanical properties are useful in many applications, including in the biomedical field and in the design of protective wear and corrective wear.

As disclosed herein, a versatile synthetic platform capable of reproducing resilin's essential structural features was pursued that yields resilient hydrogels with tunable properties including water content, stiffness, and fracture toughness. The networks described herein are based on the fast, photo-initiated crosslinking reaction of telechelic norbornene end-functionalized polymer chains with a tetra-functional thiol cross-linker. This combination of telechelic polymer chains coupled to the highly efficient thiolene cross-linking chemistry enables the formation of homogeneous networks with uniformly spaced crosslinks, low cross-link densities, and high water content, similar to resilin. The novel approach is demonstrated using a hydrophilic PEG-based network and tune the water content and mechanical properties by incorporating a hydrophobic component, polydimethylsiloxane (PDMS). This method is exceptionally simple, involving only the mixing of all of the components before photoinitiated network formation, and provides many options for tailoring the hydrogel properties using the same synthetic platform.

The swelling and mechanical properties of the hydrogels were controlled by the relative amounts of PEG and PDMS. By manipulating the volume fractions of the PEG and PDMS, a large range of water content (e.g., 54%-97%) was achieved. The Young's modulus (E) was significantly improved by increasing the volume fraction of PDMS in the hydrogel. The fracture toughness (Gc) was increased to 80 J/m$^2$ as the water content of the hydrogel decreased from 95% to 82%. In addition, the mechanical energy storage efficiency (resilience) was more than 97% at strains up to 300%. This is comparable with one of the most resilient materials known: natural resilin, an elastic protein found in many insects, such as in the tendons of fleas and the wings of dragonflies. The high resilience of these hydrogels can be attributed to the well-defined network structure provided by the versatile chemistry, low cross-link density, and lack of secondary structure in the polymer chains.

In one aspect, the invention generally relates to a crosslinked block copolymer network comprising hydrophilic blocks and hydrophobic blocks. In certain preferred embodiments, the crosslinked block copolymer network comprises hydrophilic blocks of poly(ethylene glycol) and hydrophobic blocks of polydimethylsiloxane.

In another aspect, the invention generally relates to a synthetic hydrogel, prepared by thiol-norbornene crosslink of hydrophilic poly(ethylene glycol) (PEG) and hydrophobic polydimethylsiloxane (PDMS) polymer chains, where the hydrogel is characterized by high resilience.

In yet another aspect, the invention generally relates to an article of manufacture comprising a hydrogel comprising hydrophilic blocks of poly(ethylene glycol) and hydrophobic blocks of polydimethylsiloxane.

In yet another aspect, the invention generally relates to a method for modifying the swelling and/or mechanical properties of a hydrogel of hydrophilic poly(ethylene glycol) (PEG) and hydrophobic polydimethylsiloxane (PDMS), comprising controlling the relative amounts of PEG and PDMS by adjusting the volume fractions of the PEG and/or PDMS.

*Royal Society of London Series B-Biological Sciences* 245, (721), 137-169; Elvin, et al. 2005 *Nature* 437, (7061), 999-1002.)

Figure 6:
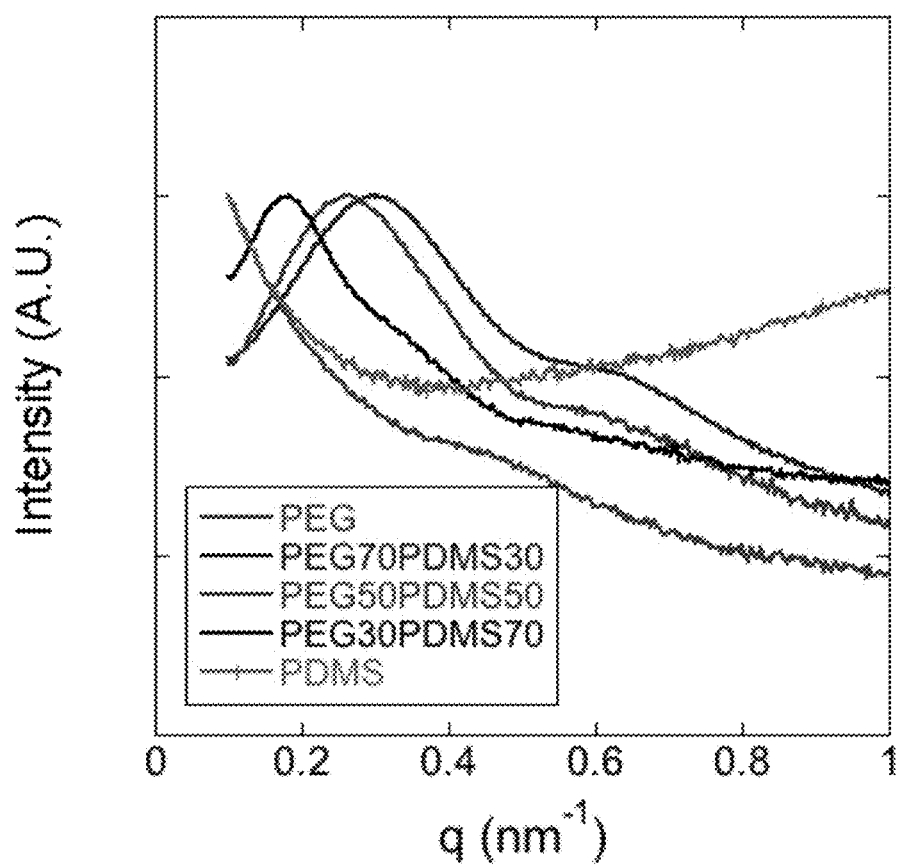

FIG. 6. Scattering intensity as a function of q for PEG, PDMS and PEG/PDMS hydrogels with different compositions.

Figure 7:
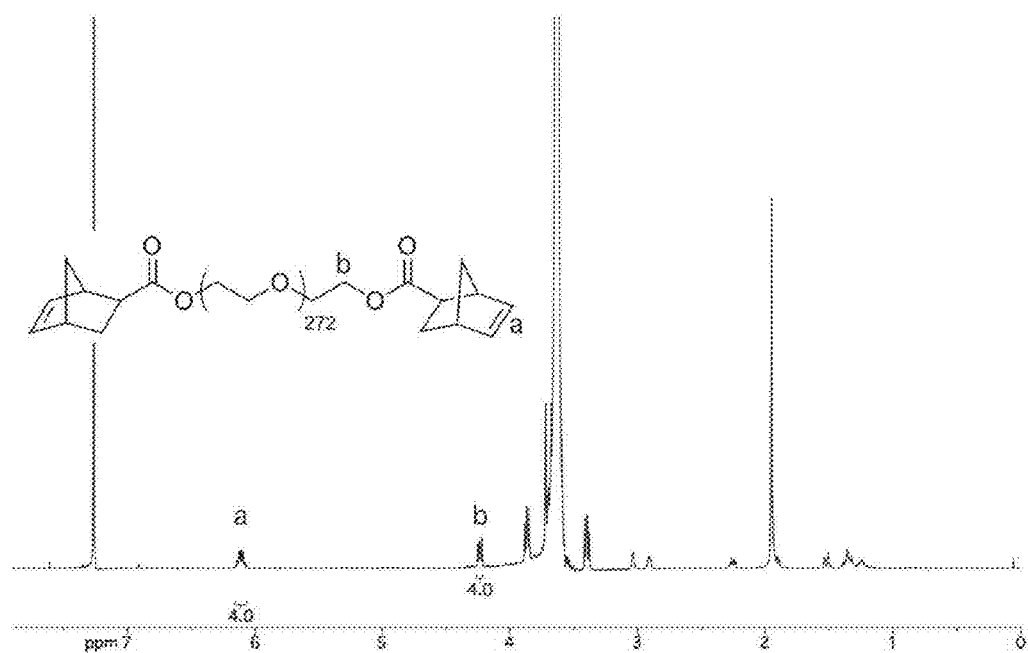

FIG. 7. $^1$H NMR of the norbornene end-functionalized PEG precursor (nor-PEG-nor) ($CDCl_3$).

Figure 8:
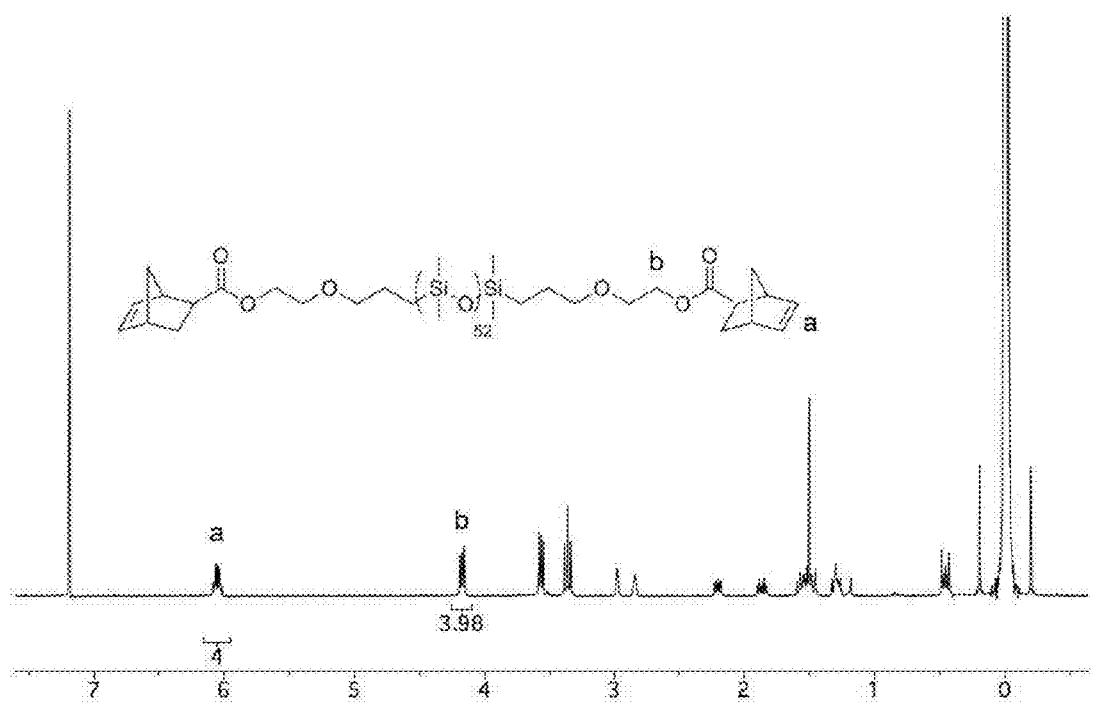

FIG. 8. $^1$H NMR of the norbornene end-functionalized PDMS precursor (nor-PDMS-nor) ($CDCl_3$).

Figure 9:
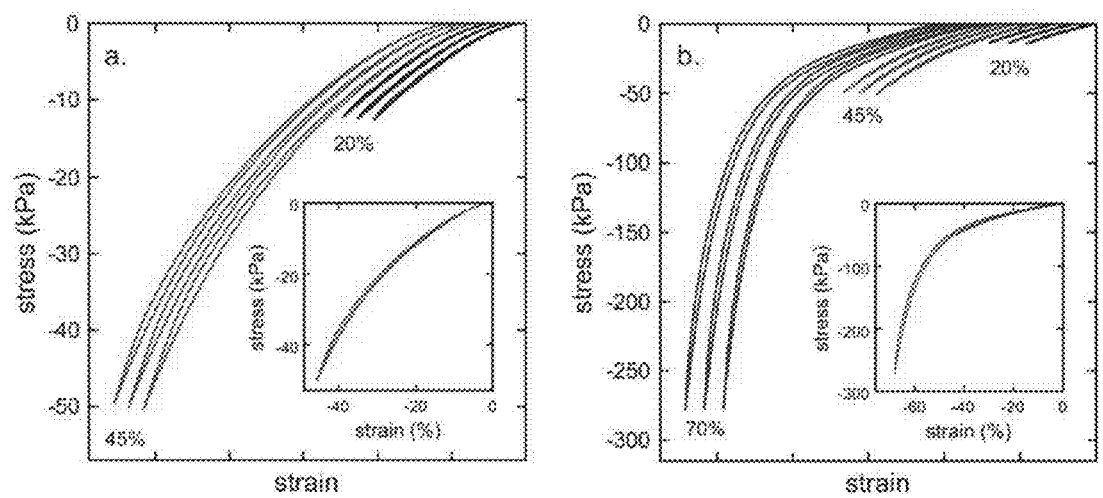

FIG. 9. Curves from cyclic loading in compression. a and b. Representative stress-strain curves for the 100:0 and 30:70 PEG/PDMS hydrogels, respectively. For clarity, the curves are shifted on the xaxis, and the final strains are given on the plots. The increment of the tick marks on the x-axis is 10% strain in a and 20% strain in b. The insets show the original stress-strain curves. The strains are not indicative of the maximum compressive strains. (The maximum compressive strains of the 100:0 and 30:70 PEG/PDMS hydrogels are 85% and 77%, respectively.)

Figure 10:
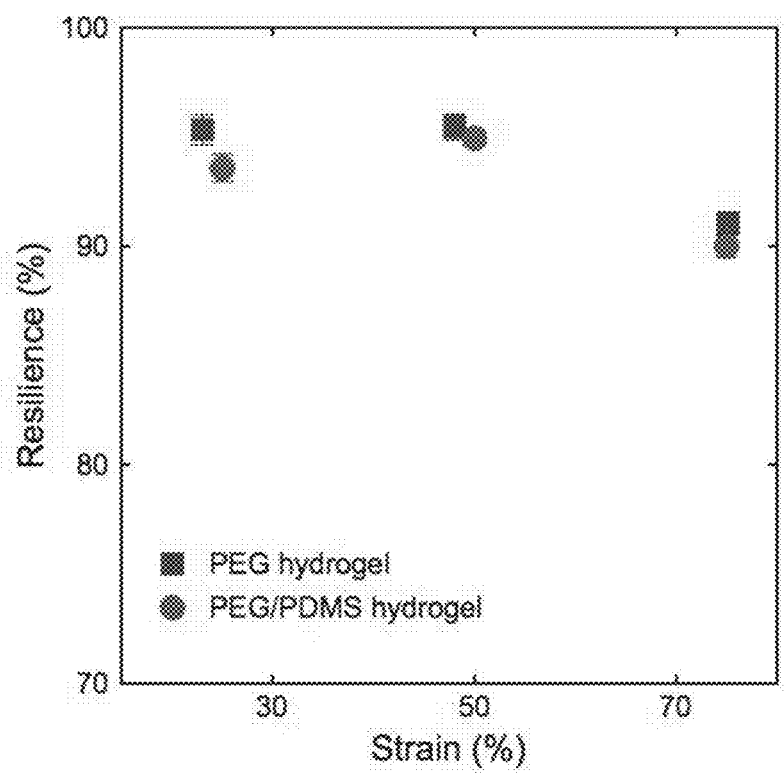

FIG. 10. Resilience as a function of strain in compression for the 100:0 and 30:70 PEG/PDMS hydrogels. Error bars indicate one standard deviation, with n≥3.

Figure 11:
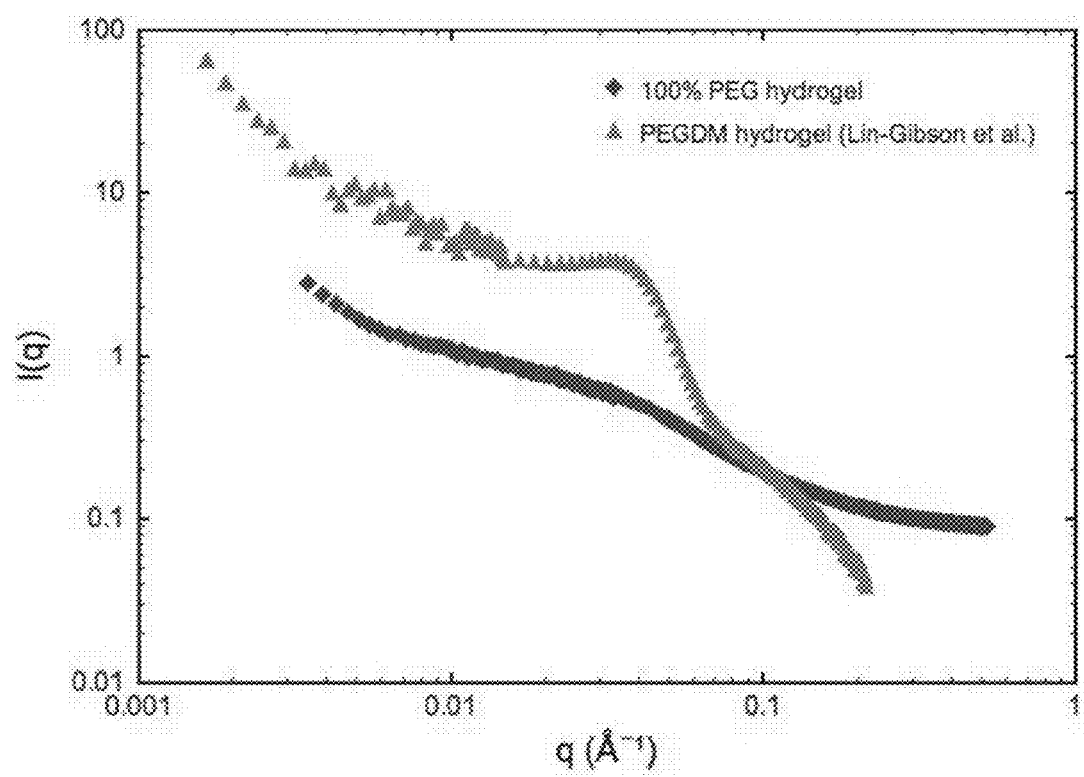

FIG. 11. SANS spectra of the tetra-functional 100:0 12 kDa PEG hydrogel and a photopolymerized 8 kDa PEG-dimethacrylate (PEGDM) (mass fraction=10%) hydrogel (PEGDM data from Lin-Gibson et al.2), demonstrating the uniform structure of the tetra-functional PEG gels as compared to randomly cross-linked systems with multifunctional cross-link junctions.

Figure 12:
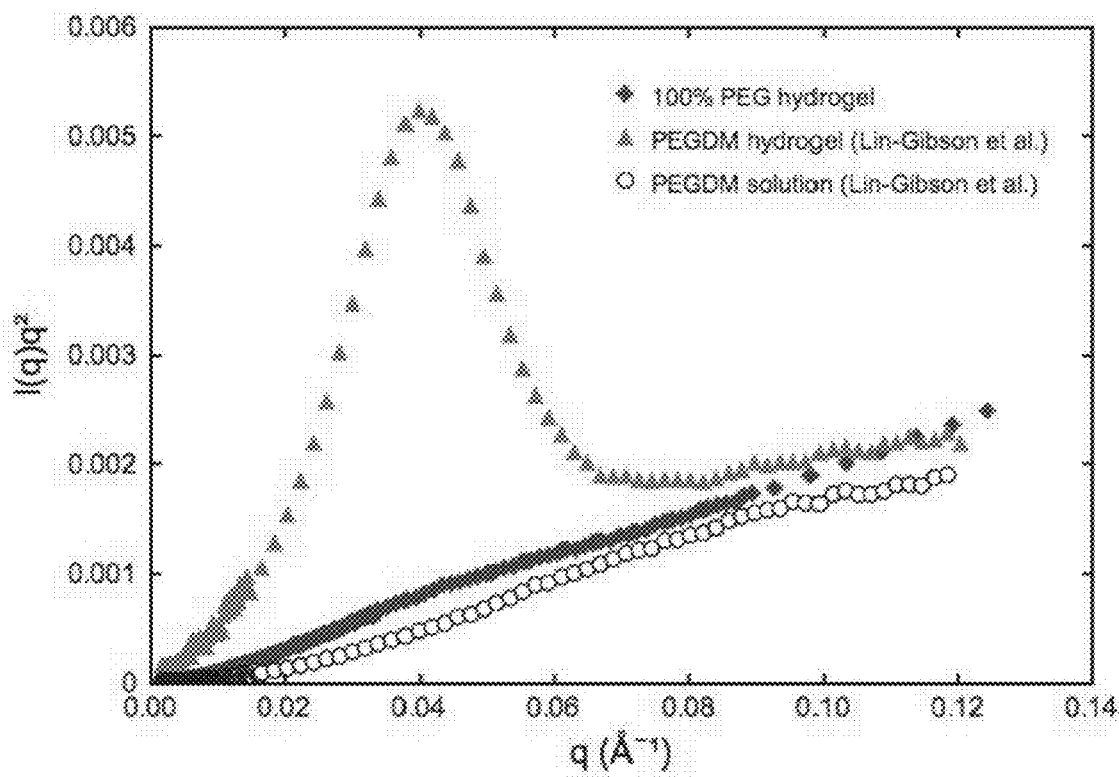

FIG. 12. Kratky plot of SANS data from the tetra-functional 100:0 12 kDa PEG hydrogel, as well as a 10 wt % 4 kDa PEGDM solution, and a photopolymerized 10 wt % 8 kDa PEGDM hydrogel (Lin-Gibson, et al. 2005 *Macromolecules* 38, (7), 2897-2902.), indicating the homogeneous structure of the tetra-functional 100:0 PEG hydrogel.

Figure 13:
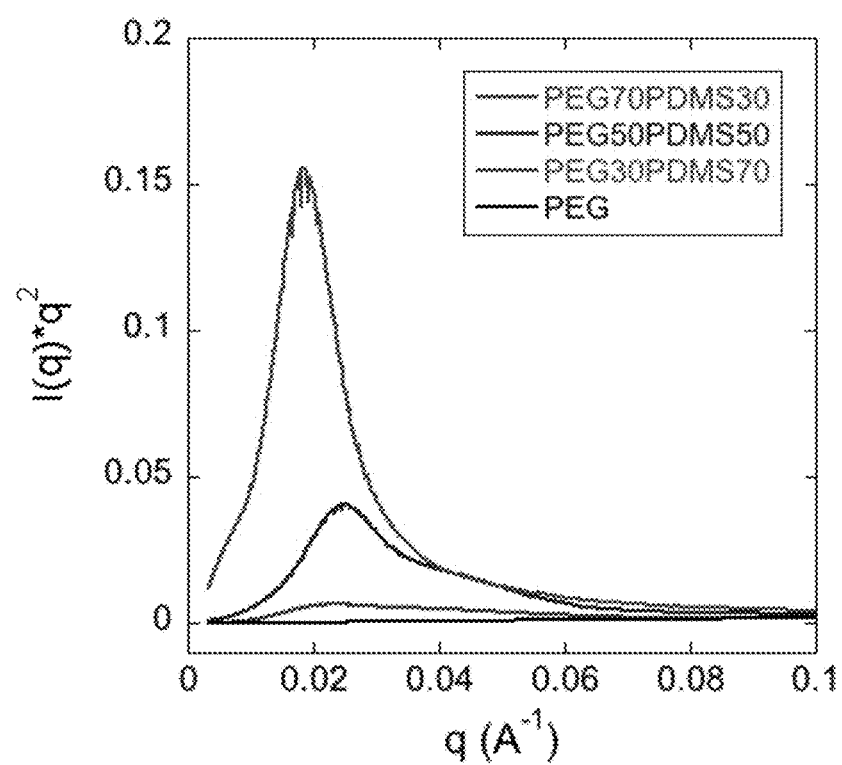

FIG. 13. Kratky plot of SANS data from the PEG and PEG/PDMS with different compositions.

Figure 14:
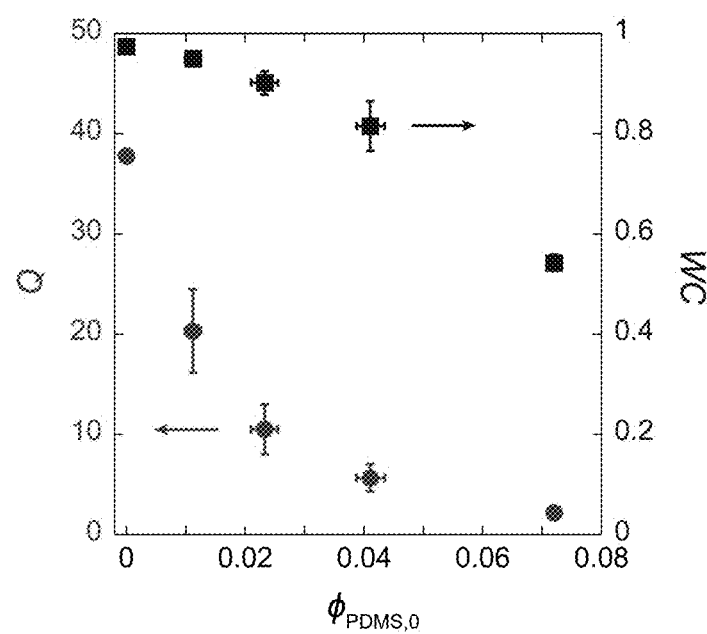

FIG. 14. Swelling ratio (Q) and equilibrium water content (WC) as a function of $\phi_{PDMS,0}$. Standard deviations were calculated from at least three samples.

Figure 15:
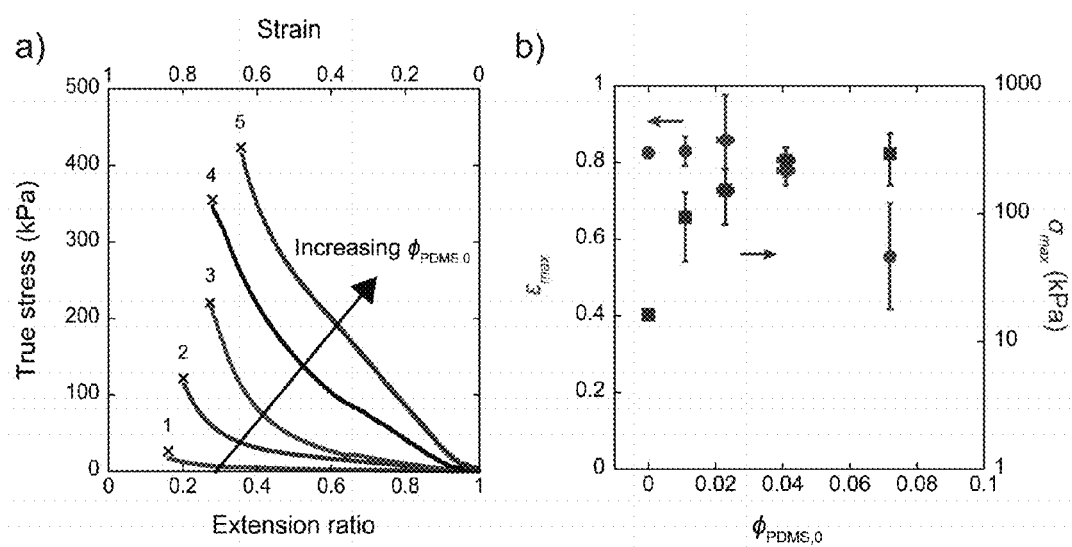

FIG. 15. Mechanical properties measured by uniaxial compression testing: a) representative curves of true stress as a function of extension ratio and strain for the hydrogels with increasing $\phi_{PDMS,0}$ (the details of the compositions are shown in Table 3); b) the maximum strain ($\epsilon_{max}$) and maximum true stress ($\sigma_{max}$) plotted as a function of $\phi_{PDMS,0}$. Standard deviations were calculated from at least three samples.

Figure 16:
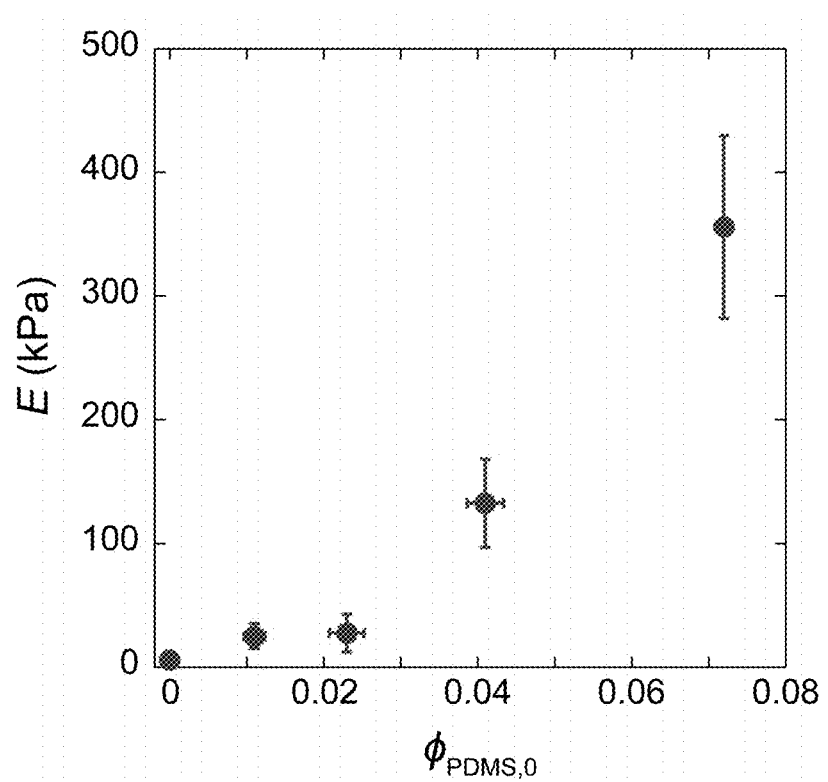

FIG. 16. Young's modulus (E) as a function of $\phi_{PDMS,0}$. Standard deviations were calculated from at least three samples.

Figure 17:
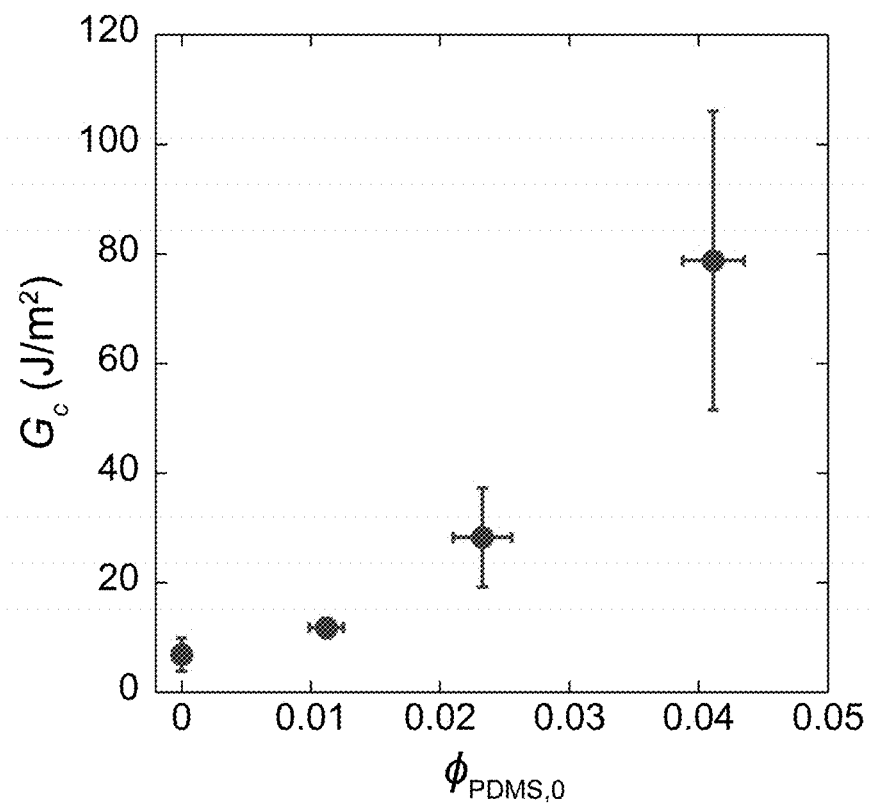

FIG. 17. Critical strain energy release rate ($G_c$) as a function of $\phi_{PDMS,0}$. Standard deviations were calculated from at least three samples.

Figure 18:
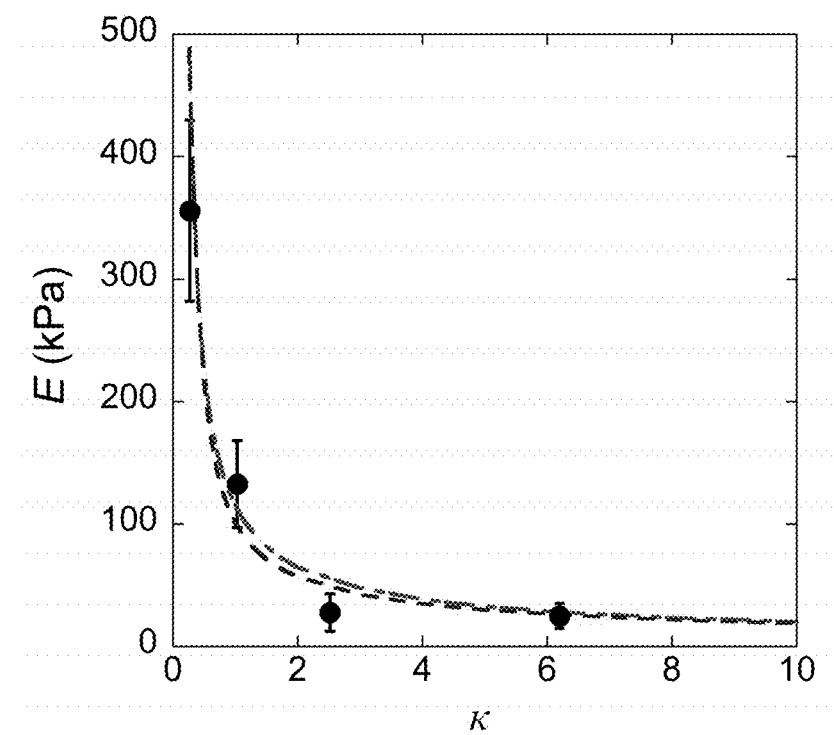

FIG. 18. Young's modulus (E) as a function of κ (=$\phi_{PEG,0}$*$\phi_{PDMS,0}$) (black circles) for the PEG/PDMS hydrogels. Standard deviations were calculated from at least three samples. Red and blue dashed lines represent the theoretical values of E as predicted by the Voigt and Reuss models for the hydrogels, respectively.

Figure 19:
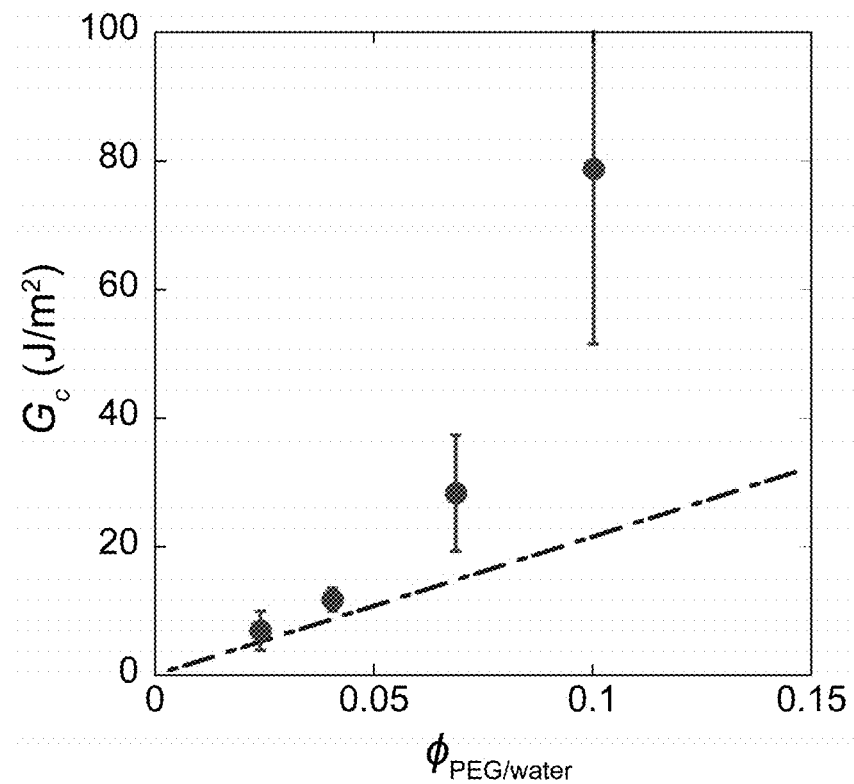

FIG. 19. Fracture toughness (G) plotted as a function of the volume fraction of PEG in the PEG phase ($\phi_{PEG/water}$). Red dots are the experimental values, corresponding to Samples 1 to 4 from left to right; blue line represents the theoretical values calculated using Lake-Thomas theory.

Figure 20:
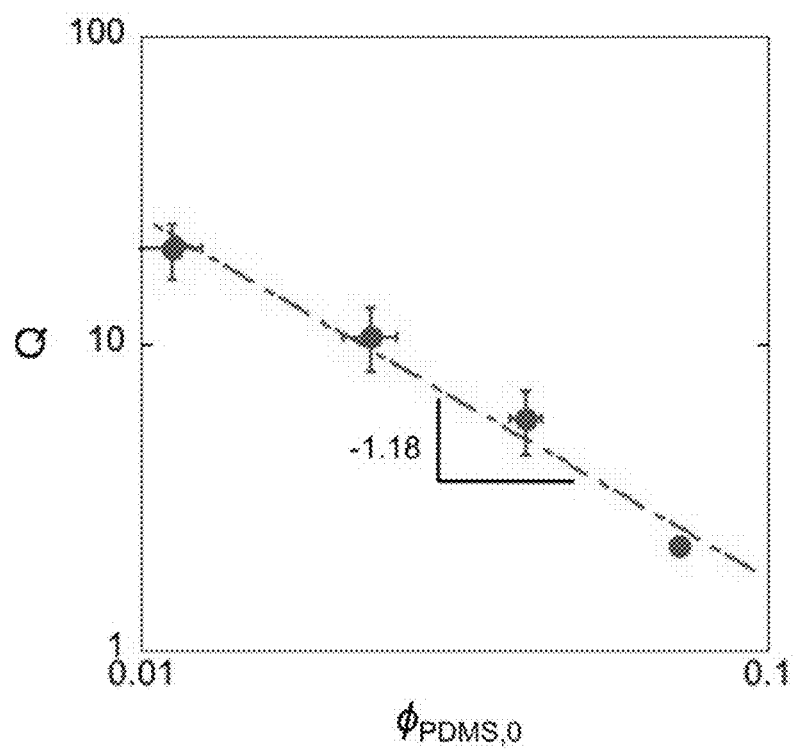

FIG. 20. Swelling ratio (Q) as a function of the initial volume fraction of PDMS ($\phi_{PDMS,0}$). Standard deviations were calculated from at least three samples.

Figure 21:
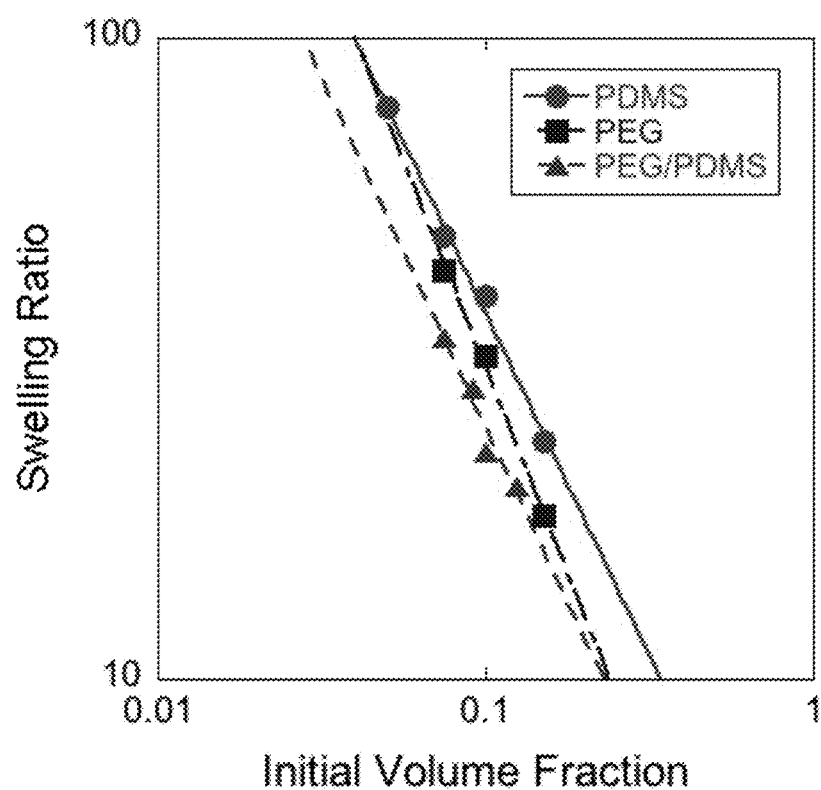

FIG. 21. Equilibrium-swelling ratio in THF as a function of initial volume fraction of polymer for PEG, PDMS and PEG/PDMS gels. (Note: one series of experiments was performed for each composition.)

Figure 22:
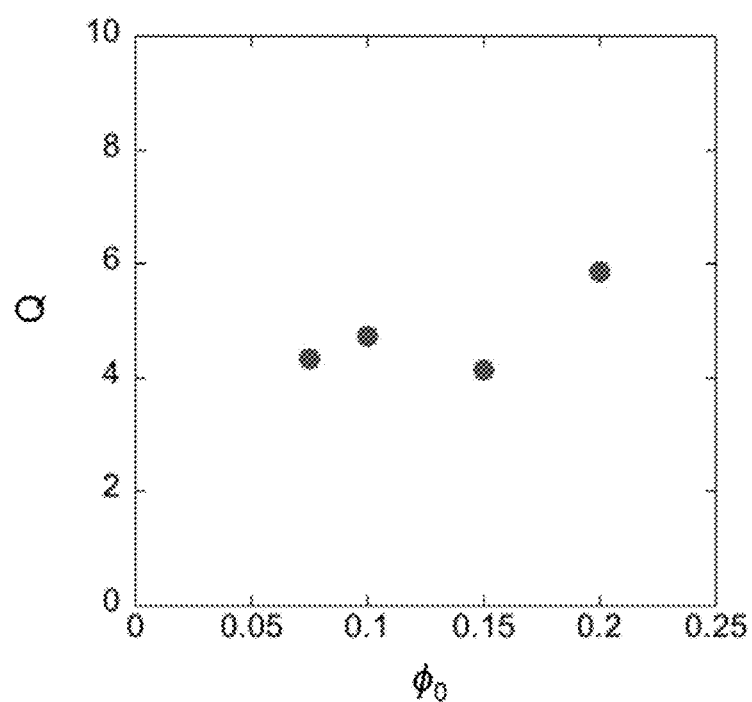

FIG. 22. Swelling ratio (Q) as a function of the initial polymer volume fraction ($\phi_0$), where the ratio of the initial volume fraction of PEG to PDMS ($\phi_{PEG,0}/\phi_{PDMS,0}$) was 1.

Figure 23:
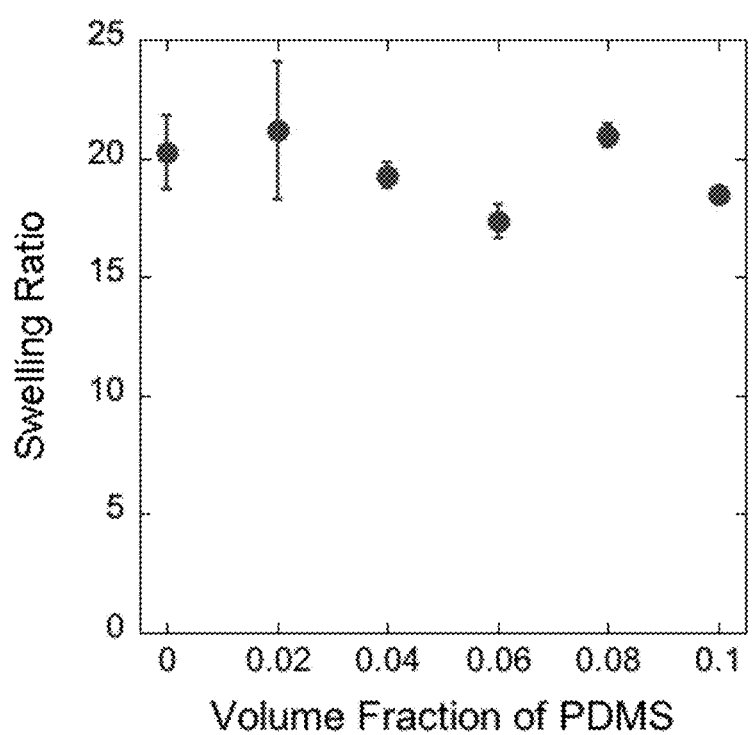

FIG. 23. Equilibrium-swelling ratio as a function of the initial volume fraction of PDMS for PEG/PDMS gels with the same initial polymer volume fraction.

Figure 24:
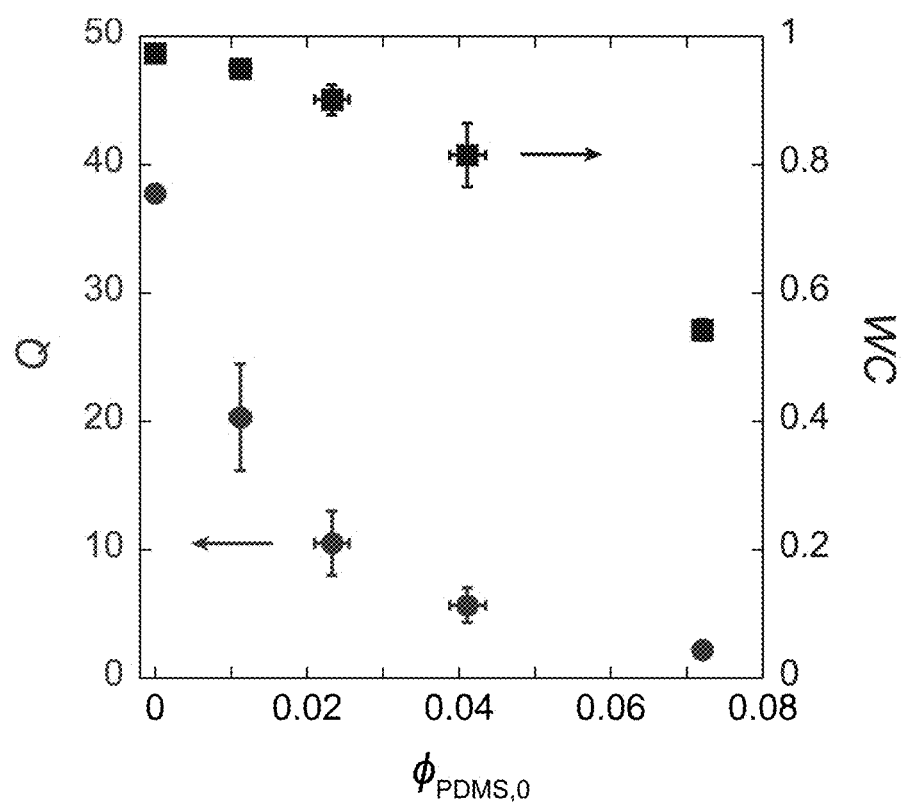

FIG. 24. Swelling ratio (Q) and equilibrium water content (WC) as a function of the initial volume fraction of PDMS. Standard deviations were calculated from at least three samples.

Figure 25:
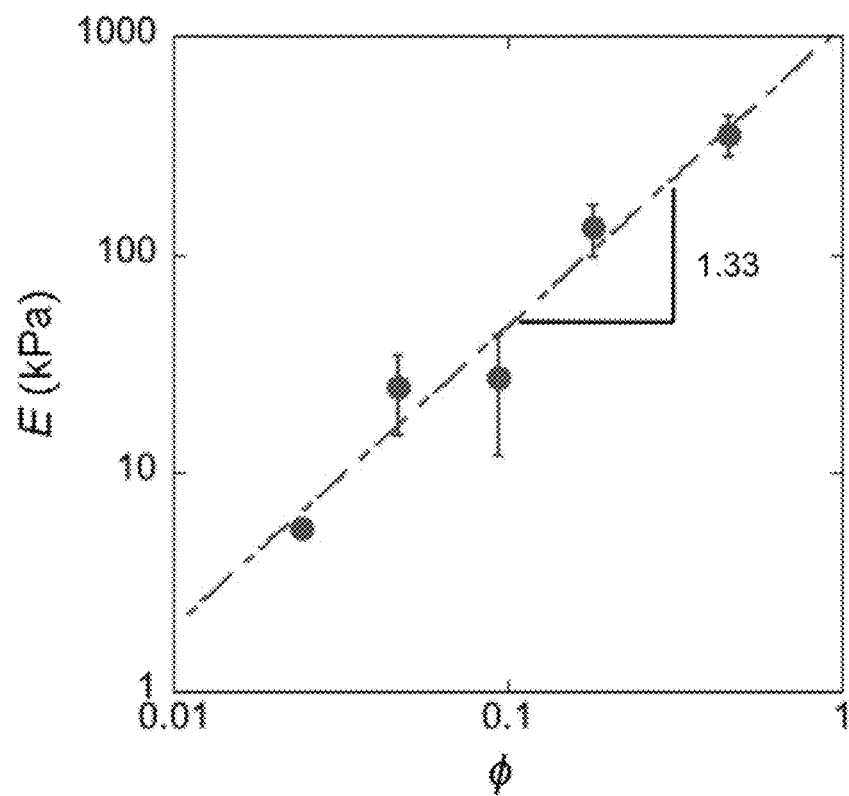

FIG. 25. Young's modulus (E) as a function of the volume fraction of the total polymer (($\rho$). Standard deviations were calculated from at least three samples.

Figure 26:
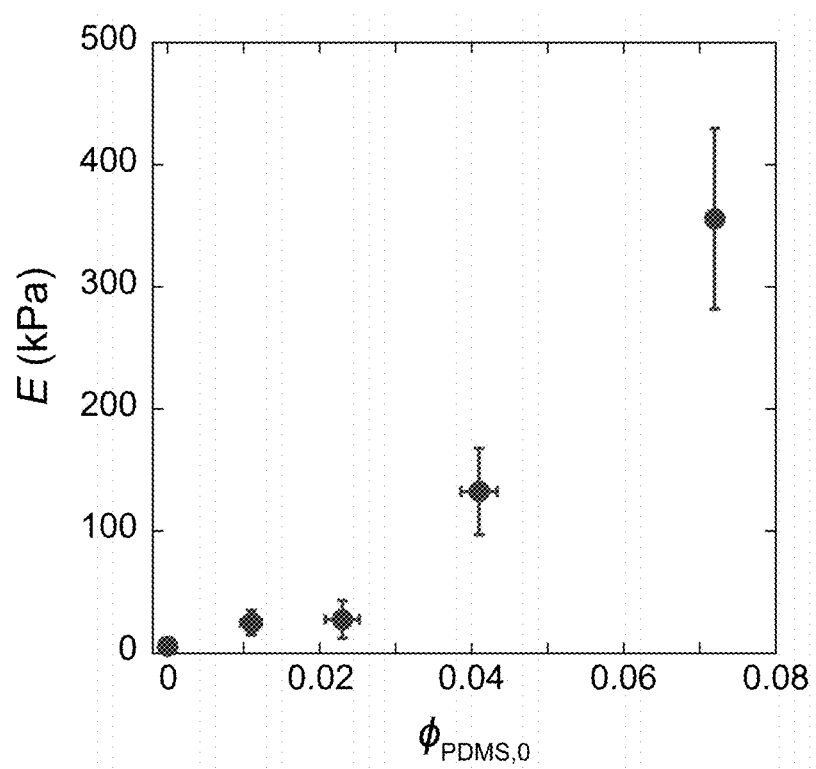

FIG. 26. Young's modulus (E) as a function of the initial volume fraction of PDMS. Standard deviations were calculated from at least three samples.

Figure 27:
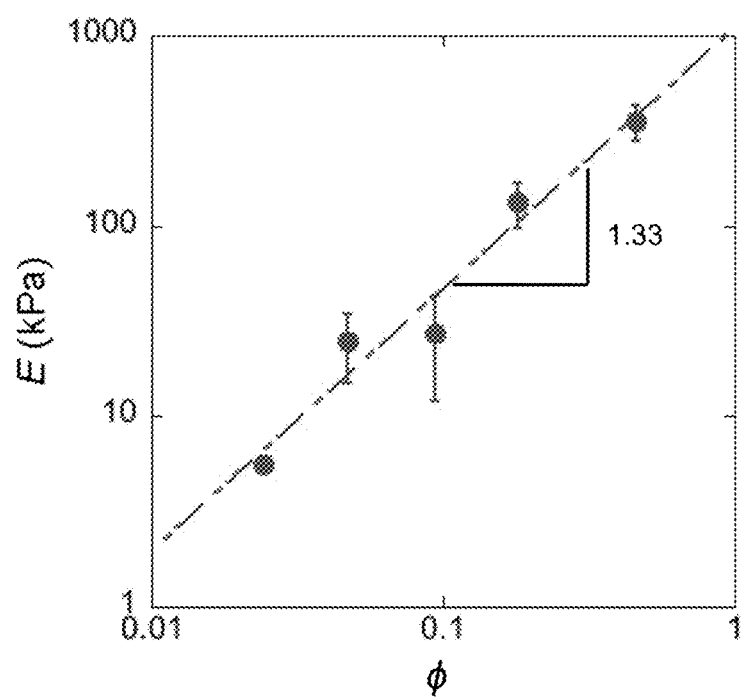

FIG. 27. Young's modulus (E) as a function of volume fraction of polymer in the equilibrium-swollen state for the PEG/PDMS hydrogels.

Figure 28:
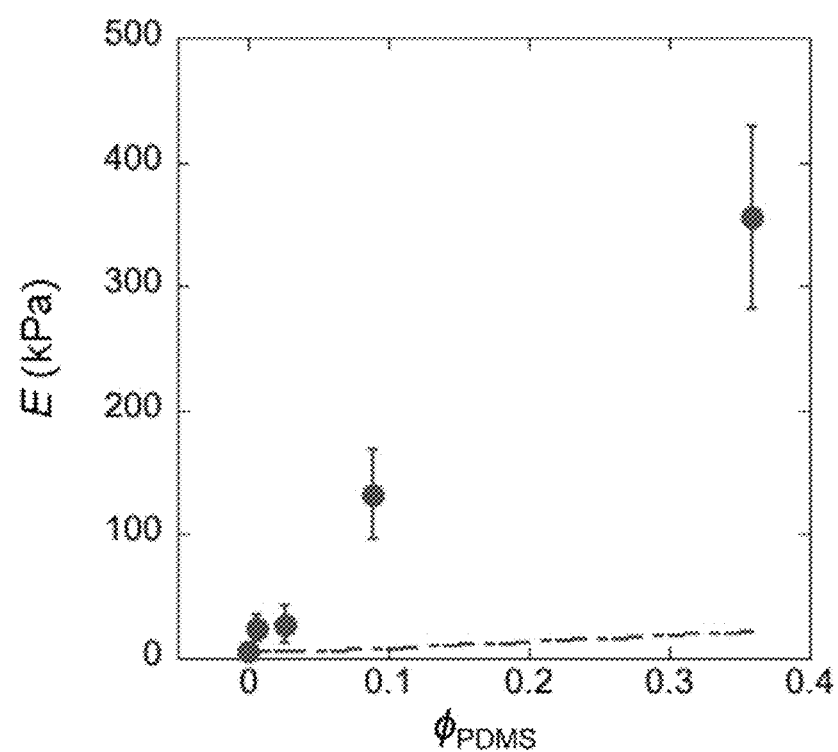

FIG. 28. Young's modulus (E) as a function of the equilibrium volume fraction of PDMS in the PEG/PDMS hydrogels (red circles). Standard deviations were calculated from at least three samples. Blue dashed line represents the theoretical values of E predicted by the Guth-Gold model.

Figure 29:
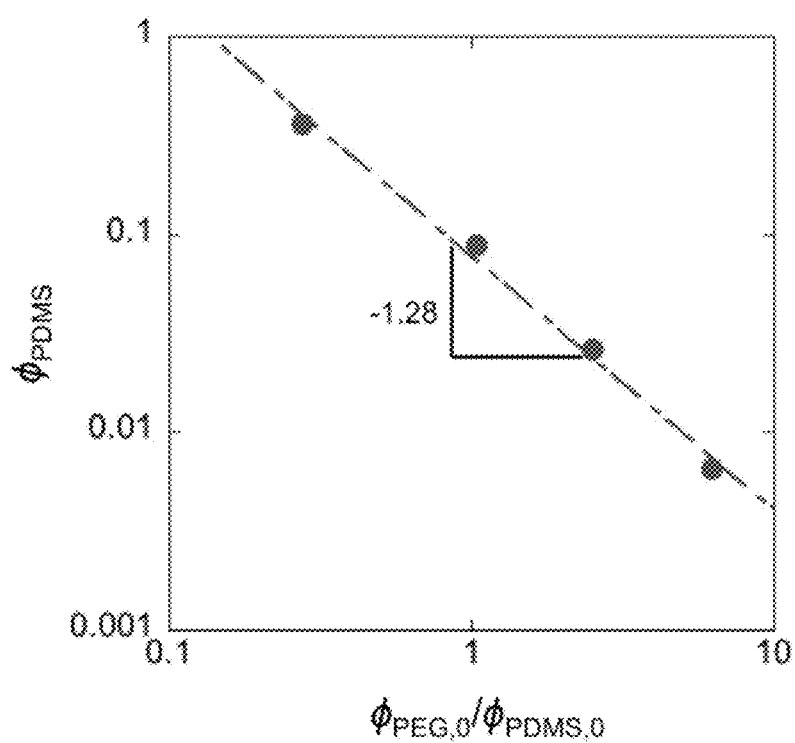

FIG. 29. Relationship between the equilibrium volume fraction of PDMS ($\phi_{PDMS}$) and the ratio of the initial volume fraction of the PEG to PDMS ($\phi_{PEG,0}/\phi_{PDMS,0}$=κ).

Figure 30:
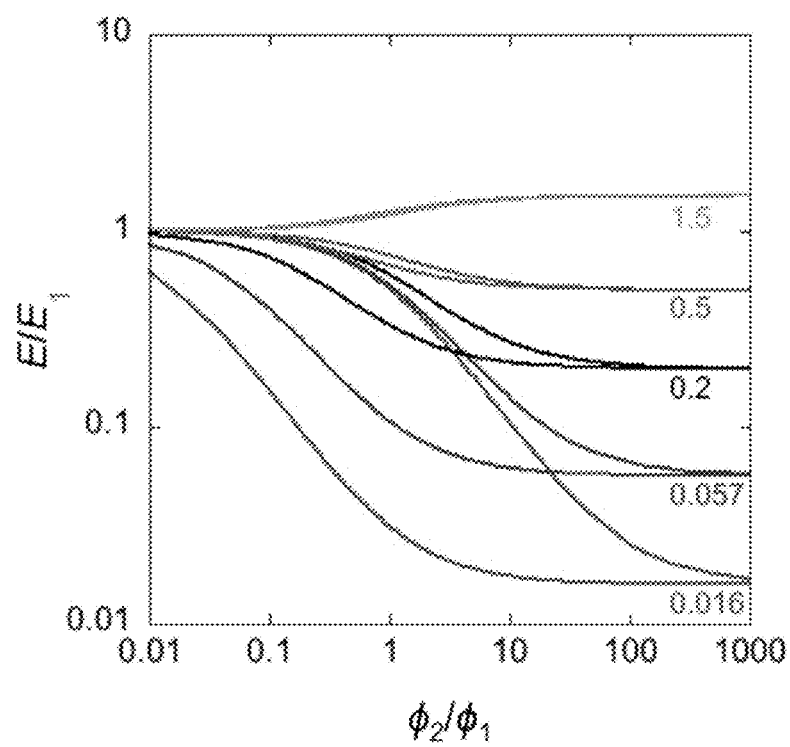

FIG. 30. Universal plot of the normalized composite moduli predicted by the Voigt model (upper line) and Reuss model (lower line) as a function of the volume fraction ratio of the two components in the (composite $\phi_2/\phi_1$). The value show on each curve represents the modulus ratio of the two components ($E_2$ $E_1$) the composite $\phi_2/\phi_1$).

Figure 31:
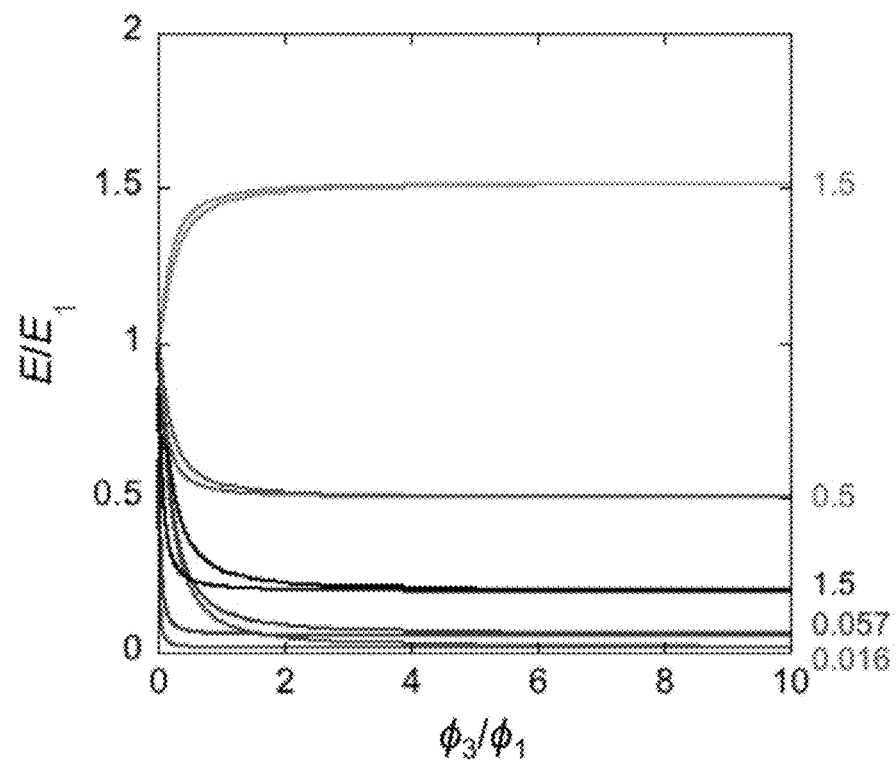

FIG. 31. Plot of the normalized composite moduli predicted by the Voigt model (upper line) and the Reuss model (lower line) as a function of volume fraction ratio ($\phi_3/\phi_1$), which scales with the volume fraction ratio ($\phi_2/\phi_1$) as $\phi_3/\phi_1=10.5(\phi_2/\phi_1)^{1.4}$. This is the scaling relationship for the PEG/PDMS hydrogels, where $\phi_1=\phi_{PDMS}$, $\phi_2=\phi_{PEG}+\phi_{water}$ and $\phi_3=\phi_{PEG}$. The value shown on each curve represents the modulus ratio of the two components ($E_2/E_1$).

Figure 32:
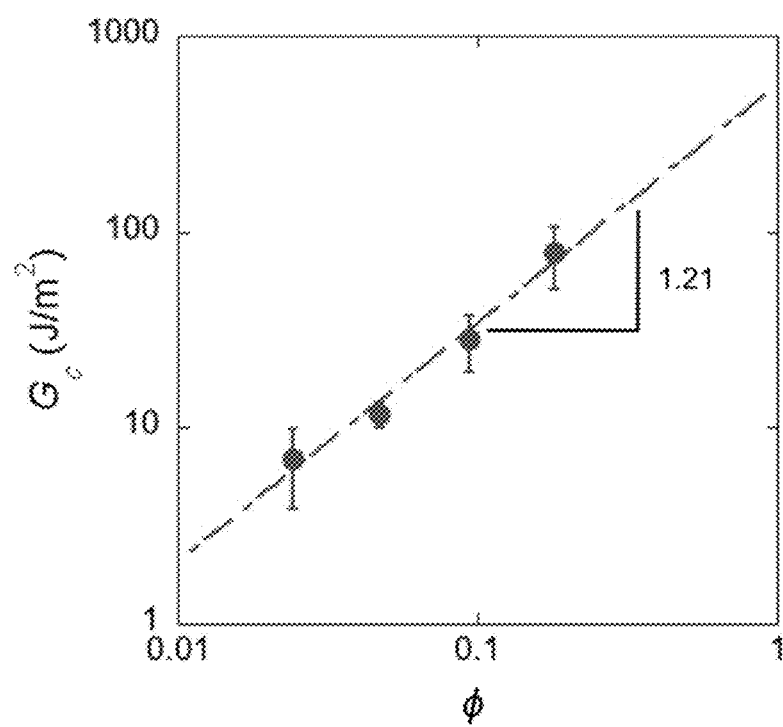

FIG. 32. Critical strain energy release rate (Gc) plotted as a function of the volume fraction of the total polymer ($\phi$). Standard deviations were calculated from at least three samples.

Figure 33:
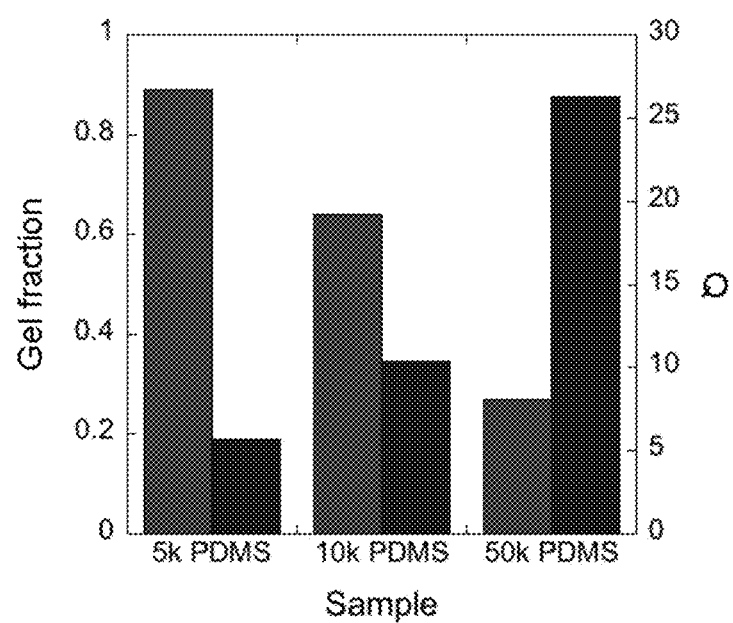

FIG. 33. Gel fraction (red column) and equilibrium-swelling ratio (blue column) for PEG/PDMS hydrogels with different PDMS molecular weights (Note: the data only represented one series of hydrogel samples).

Figure 34:
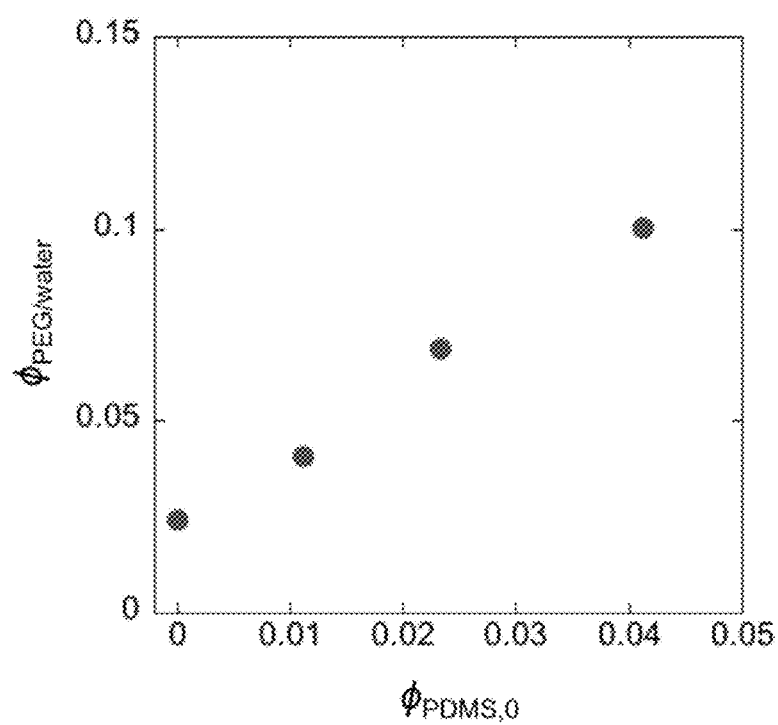

FIG. 34. The volume fraction of PEG in the PEG phase ($\phi_{PEG/water}$) plotted as a function of the initial volume fraction of PDMS ($\phi_{PDMS,0}$).

Figure 35:
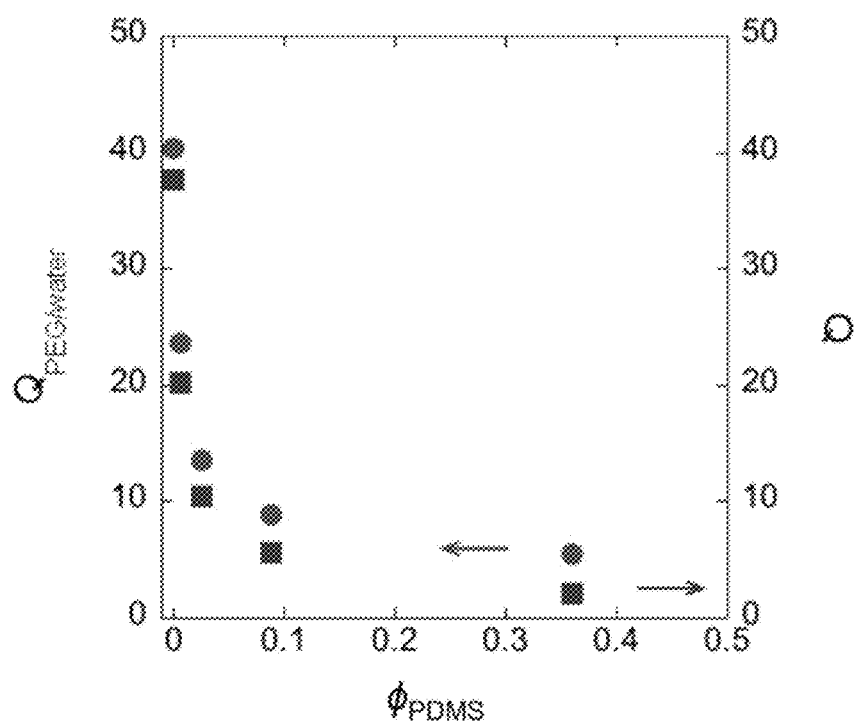

FIG. 35. The swelling ratio of PEG in the PEG phase ($Q_{PEG/water}$) and the swelling ratio of the hydrogels plotted as a function of the volume fraction of PDMS ($\phi_{PDMS}$) at the equilibrium-swollen state.

Figure 36:
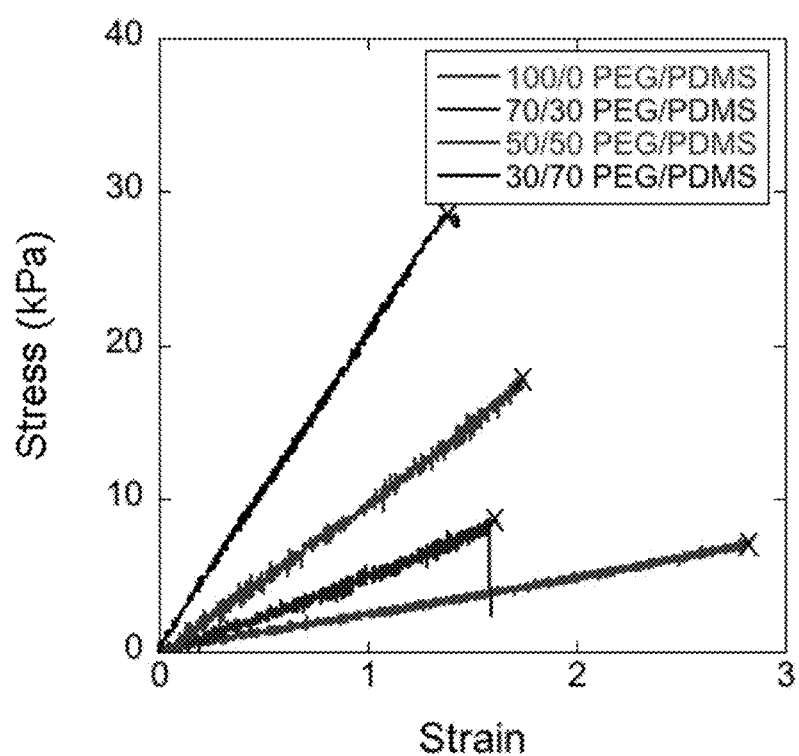

FIG. 36. Representative plots of stress-strain relationship in tension for swollen PEG/PDMS hydrogels with different PEG to PDMS molar ratios.

Figure 37:
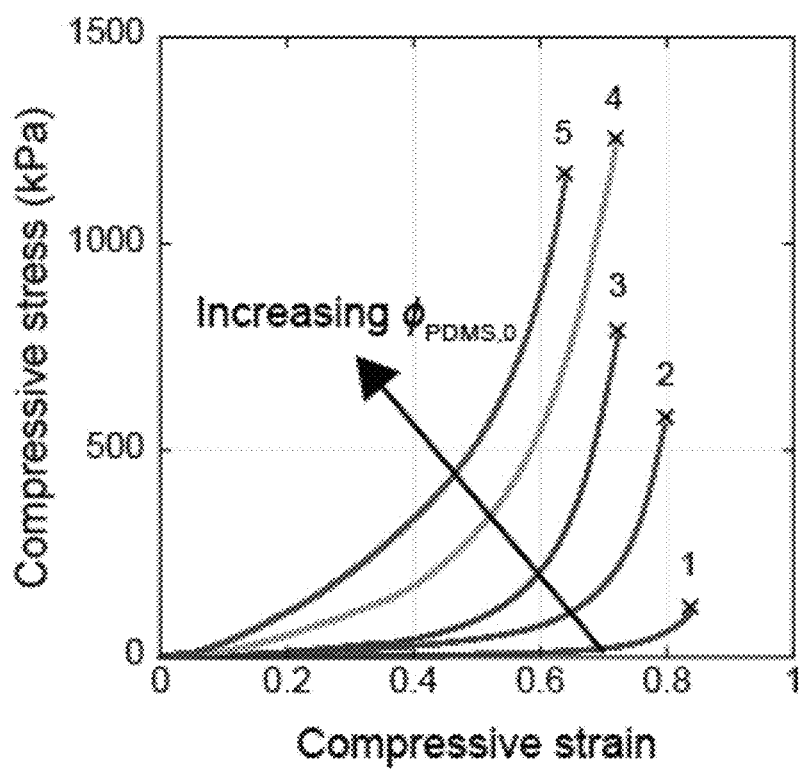

FIG. 37. Representative curves of compressive stress as a function of compressive strain for swollen PEG/PDMS hydrogels with different volume fractions of PEG and PDMS.

Figure 38:
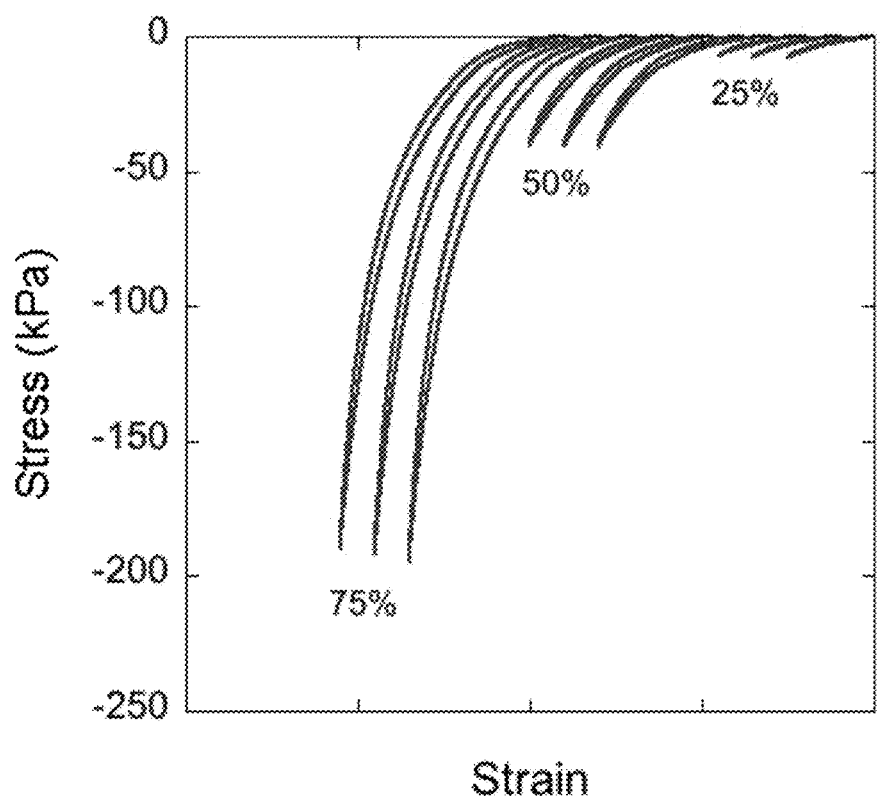

FIG. 38. Representative curves for cyclic stress-strain relationship of the 70/30 PEG/PDMS sample. For clarity, the curves are shifted on the strain axis, and the final strains are given on the plots.

Figure 39:
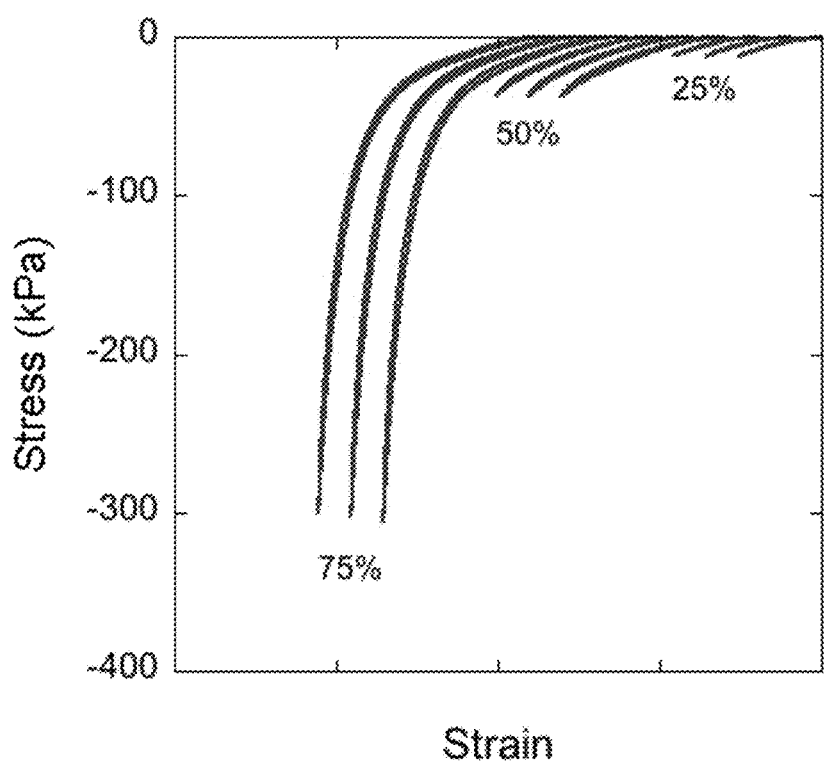

FIG. 39. Representative curves for cyclic stress-strain relationship of the 50/50 PEG/PDMS sample. For clarity, the curves are shifted on the strain axis, and the final strains are given on the plots.

Figure 40:
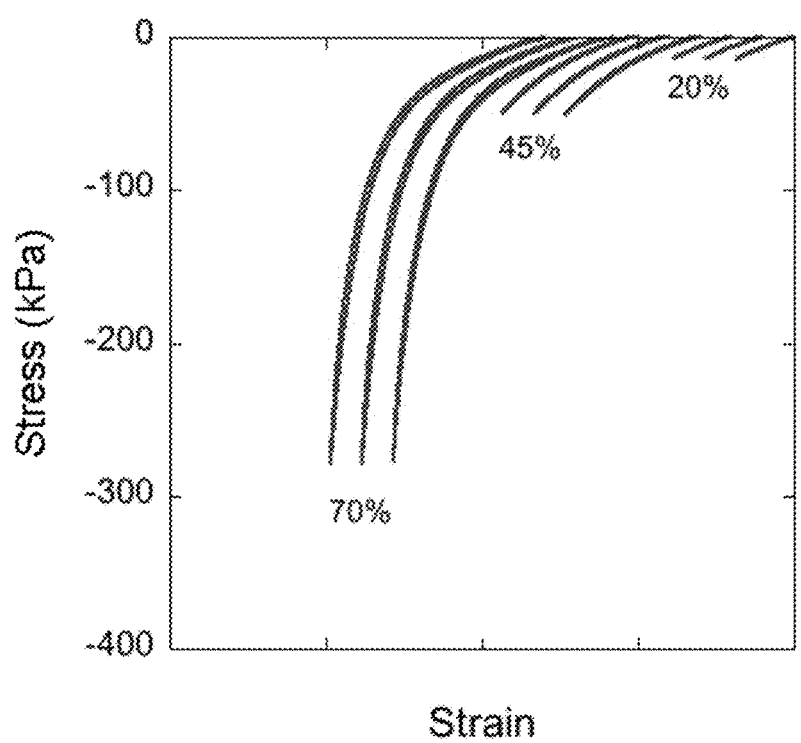

FIG. 40. Representative curves for cyclic stress-strain relationship of the 30/70 PEG/PDMS sample. For clarity, the curves are shifted on the strain axis, and the final strains are given on the plots.

Figure 41:
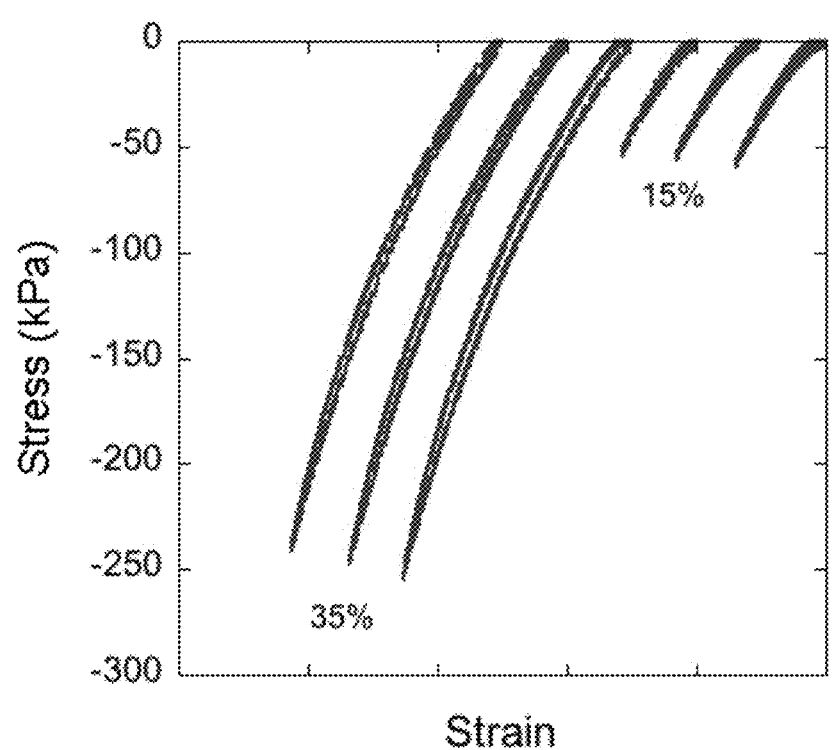

FIG. 41. Representative curves for cyclic stress-strain relationship of the 10/90 PEG/PDMS sample. For clarity, the curves are shifted on the strain axis, and the final strains are given on the plots.

Figure 42:
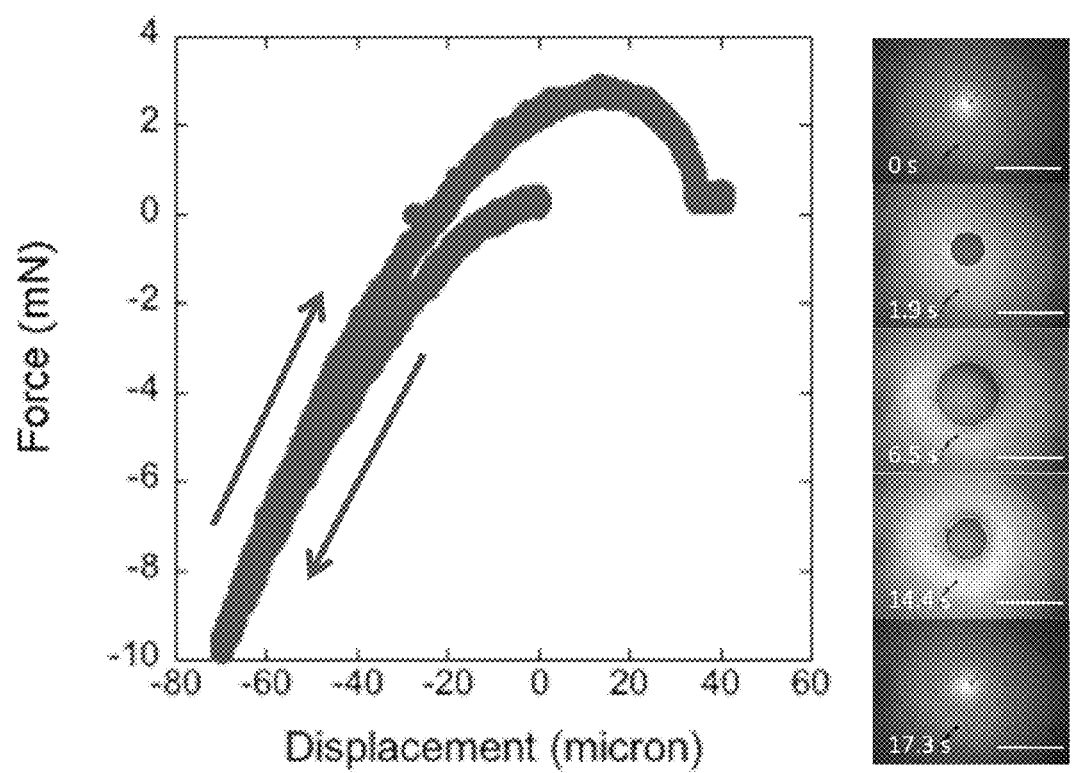

FIG. 42. A representative plot of force versus displacement of the PDMS network measured by the contact adhesion test. Arrows show the direction of the force. The pictures of contact areas are shown on the right with the corresponding time. Scale bar represented 1 mm.

Figure 43:
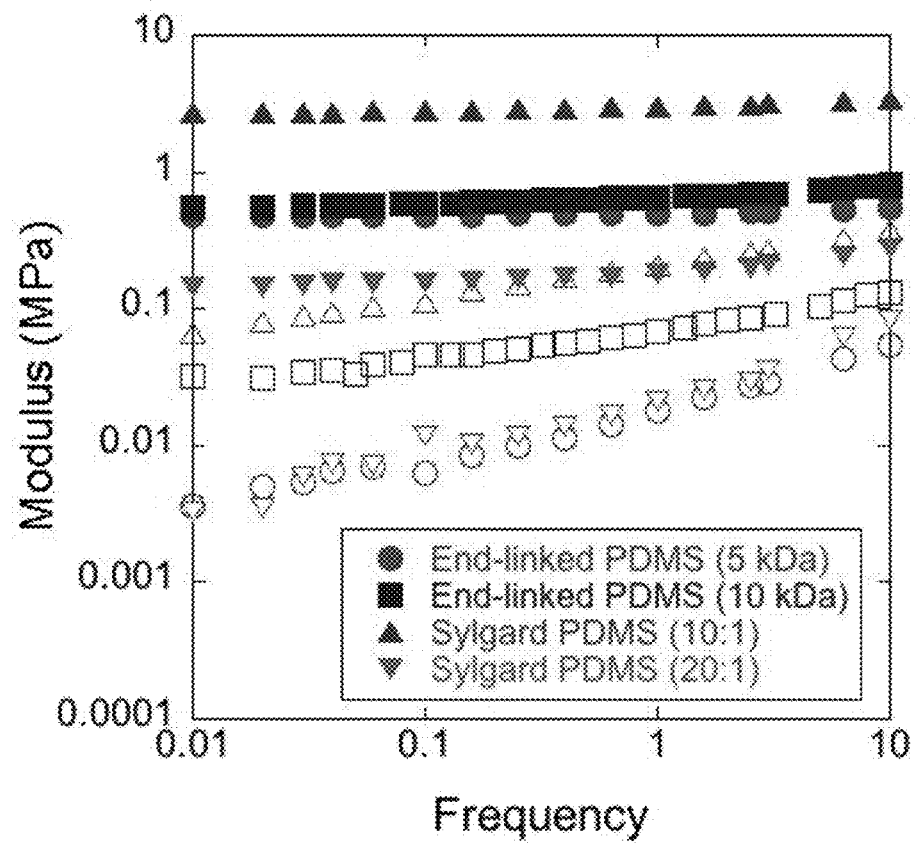

FIG. 43. Storage modulus (solid symbol) and loss modulus (open symbol) as a function of frequency (0.01-10 Hz) for the end-linked PDMS and Sylgard PDMS networks with different compositions measured by DMA.

DETAILED DESCRIPTION OF THE INVENTION

The invention provides highly resilient synthetic hydrogels, which can be prepared by using the efficient thiol-norbornene chemistry to cross-link hydrophilic PEG and hydrophobic PDMS polymer chains. The simple hydrogel systems with enhanced mechanical properties are useful in many applications, including in the biomedical field and in the design of protective wear and corrective wear.

The combination of high resilience and excellent mechanical properties seen in water-swollen natural materials like resilin and elastin has been difficult to reproduce in purely synthetic hydrogels to date. Here the fundamental network elements of resilin, including a uniform network structure and unstructured primary chains, were built into simple synthetic polymer systems to form new networks using novel, robust, yet scalable synthetic polymer chemistry. This resulted in a unique hydrogel system with tunable properties. Cyclic tensile testing on the 100:0 and 30:70 PEG/PDMS hydrogels (95 and 82% water, respectively) demonstrated that they maintained a resilience greater than 97% across all measured strains (up to 300%). In addition, these synthetic systems demonstrated similar extensibility and resilience as resilin. This work highlights the importance of understanding the structure-property relationships of natural materials and how this knowledge can be applied in the development of synthetic systems.

Figure 1:
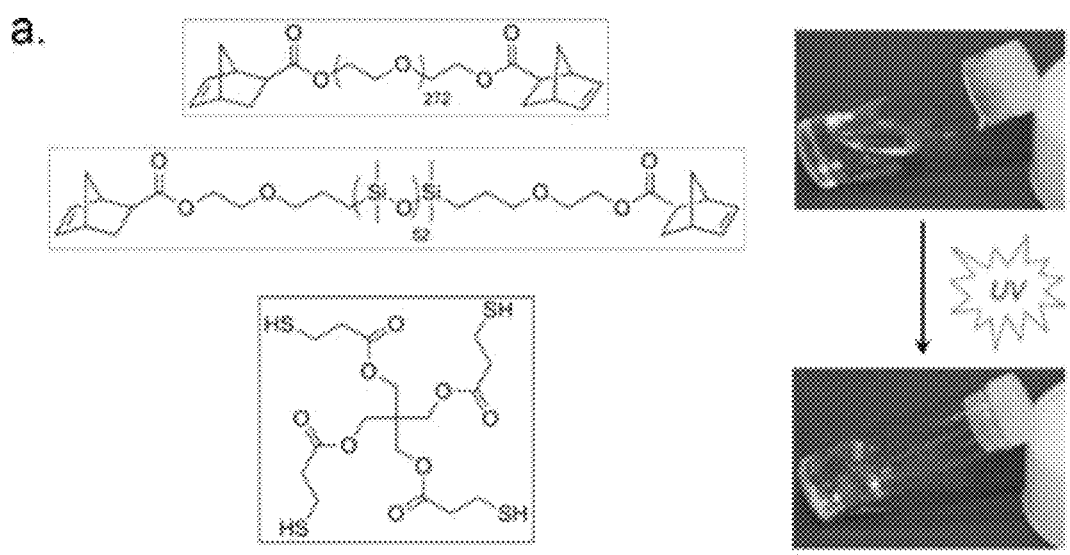
FIG. 1. (a) Chemical structures of the norbornene endfunctionalized PEG and PDMS polymer precursors and the PETMP cross-linker (left) as well as photographs before and after UV exposure (right). (b) Photographs of 100:0 and 30:70 PEG/PDMS hydrogels swollen to equilibrium in water, along with the corresponding schematics illustrating the PEG (blue) and PDMS (red) polymerchains that constitute the networks.
Figure 1:
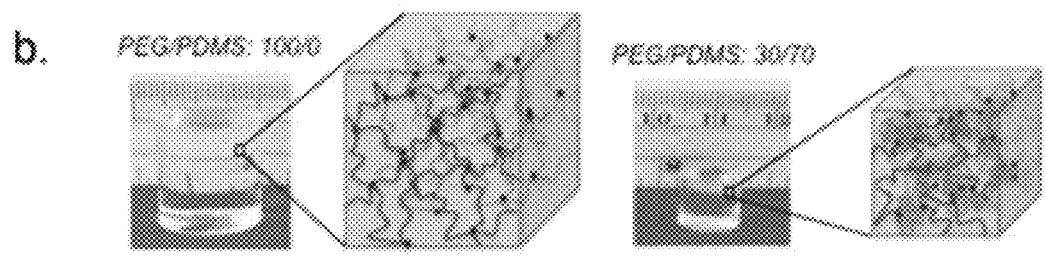

The networks disclosed herein include PEG and PDMS precursor polymer chains functionalized with norbornene endgroups, as shown in FIG. 1a ($^1$H NMRs in FIGS. 7 and 8). They were cross-linked with the tetra-functional cross-linker pentaerythritol tetrakis(3-mercaptopropionate) (PETMP) in an organic solvent so that the PEG and PDMS were homogeneously mixed in the precursor solution during network formation. The gels were washed and then swollen to equilibrium in deionized water. By simply varying the molar ratio of PEG to PDMS, the water content and mechanical properties of the hydrogels were controlled, while maintaining high resilience. Robust mechanical analysis demonstrates that these are a new class of materials that remains highly resilient across all strains (up to 300%) examined to date, with exquisitely tunable mechanical properties and water content.

Figure 2:
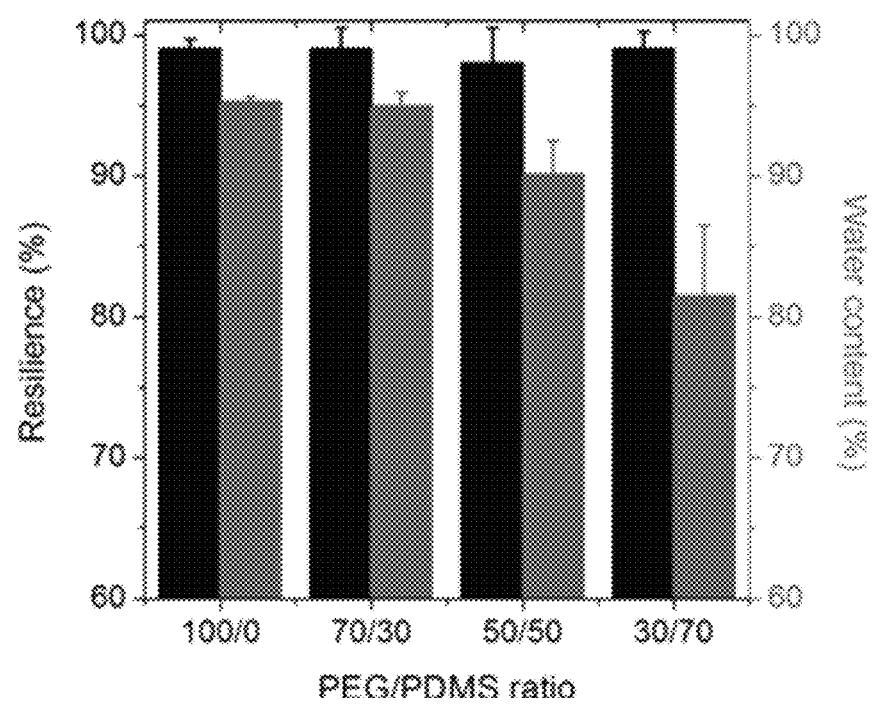
FIG. 2. Plot of the resilience and water content of the PEG/PDMS hydrogels as a function of the molar ratio of PEG:PDMS. Error bars indicate one standard deviation, with n≥3.

A series of hydrogels were prepared with molar ratios of PEG to PDMS ranging from 100:0 to 30:70 (Table 2). As the PDMS content increased, the equilibrium water content decreased. This difference in swelling is visible in the representative photographs in FIG. 1b comparing the 100:0 and 30:70 PEG/PDMS hydrogels swollen to equilibrium in water. The equilibrium water contents are shown in FIG. 2, going from over 95% water in the 100:0 PEG hydrogel (equilibrium mass swelling ratio Q=21) to 82% water in the 30:70 hydrogel (Q=6). Whereas this is higher than the water content of natural resilin (50-60%), it is comparable to reported values for recombinant RLP-based materials (80-90%) that show similar resilience. (Elvin, et al. 2005 *Nature* 437, (7061), 999-1002; Li, et al. 2011 *Biomacromolecules* 12, (6), 2302-2310.)

For the PEG/PDMS hydrogels, the cross-linking reaction was performed in THF. To examine the polymer-polymer and polymer-solvent interactions in the preparation state, swelling properties in THF were investigated for PEG, PDMS and PEG/PDMS gels, where the molar ratio of the PEG to PDMS is 3:7. For each sample, after curing the gel was washed and then swollen to equilibrium. The swelling ratio (Q) was determined using the weight of equilibrium-swollen gel divided by the weight of the corresponding dry gel.

In classic scaling theory, the swelling ratio correlated to the initial volume fraction of polymer ($\phi_0$) as $Q\sim\phi_0^{-1}$ for good solvent and $Q\sim\phi_0^{-5/4}$ for theta solvent. (Guo, et al. 2010 *Soft Matter* 6 (19), 4807-4818.) In the PEG gels Q scales with $\phi_0$ to $-1.3$, while in the PDMS gels Q scales with $\phi_0$ to $-1.1$. This demonstrated that THF acted as a good solvent for both PEG and PDMS. In the PEG/PDMS gels, Q scales with $\phi_0$ to $-1.1$. The comparable parameters demonstrated that the PEG and PDMS behave similarly in THF, indicating that the gel formed had a randomly distributed homogeneous structure. To further demonstrate this solvent behavior, a series of PEG/PDMS gels with the same initial volume fraction was investigated. The total volume fraction of these gels was kept constant, while the ratio of PEG to PDMS was varied. As shown in FIG. 23, Q was unchanged for PEG/PDMS gels with the same initial polymer volume fraction. Varying the ratio of PEG to PDMS had little influence on the swelling properties in THF. This further demonstrated the similar behaviors of PEG and PDMS in THF solution.

The swelling properties in water were determined by the equilibrium-swelling ratio, which was calculated by the weight of equilibrium-swollen hydrogels divided by the corresponding dry gel. The initial volume fractions of PEG ($\phi_{PEG,0}$) and PDMS ($\phi_{PDMS,0}$) were varied, while the total polymer volume fraction remained constant ($\phi_0$=0.08-0.09) (Table 1). Fixing $\phi_0$ allowed us to neglect the impact of the total polymer volume fraction and only to examine the influence of the ratio of PEG to PDMS in the context of swelling in water. FIG. 24 showed the equilibrium-swollen ratio (Q) and the equilibrium water content (WC) as a function of $\phi_{PDMS,0}$, where Q decreased from 38 to 2.2 and WC decreased from 97% to 54% as $\phi_{PDMS,0}$ increased from 0 to 0.072.

TABLE 1

Initial volume fractions of PEG, PDMS, and total polymer in the preparation state.

| Sample | Name | Preparation state[a] | | |
|---|---|---|---|---|
| | | $\phi_{PEG,0}$ | $\phi_{PDMS,0}$ | $\phi_0$ |
| 1 | PEG | 0.084 | 0 | 0.084 |
| 2 | PEG70PDMS30 | 0.069 | 0.011 | 0.080 |
| 3 | PEG50PDMS50 | 0.059 | 0.023 | 0.082 |
| 4 | PEG30PDMS70 | 0.043 | 0.041 | 0.084 |
| 5 | PEG10PDMS90 | 0.020 | 0.072 | 0.092 |
| 6 | PDMS | 0 | 0.089 | 0.089 |

[a]In the preparation state, $\phi_0 = \phi_{PEG,0} + \phi_{PDMS,0}$. The numbers in each sample name show the molar ratio of PEG to PDMS in the preparation state.

The Young's modulus under compression was determined from the slope of the initial linear portion (up to a strain of 0.1) of the stress-strain curve. As shown in FIG. 26, with an increase of $\phi_{PDMS,0}$ E increased by almost two orders of magnitude, from 5.6 kPa ($\phi_{PDMS,0}=0$) to 360 kPa ($\phi_{PDMS,0}=0.072$). This increase can be attributed to the decrease in water content of the PEG/PDMS hydrogels with increasing $\phi_{PDMS,0}$. However, unlike conventional gels, where $E \sim \phi^{9/4}$ in a good solvent and $E \cdot \phi^3$ in a theta solvent, the modulus of the PEG/PDMS hydrogels scaled as $E \sim \phi^{1.33}$ (FIG. 27). (Guo, et al. 2010 *Soft Matter* 6 (19), 4807-4818.) This indicates that the conventional scaling laws are not applicable for the PEG/PDMS hydrogels. E of the PDMS gel (see Table 1 for the detailed composition) was also determined by the compressive measurements, which gave a value of 350 kPa, comparable with the modulus of the PEG/PDMS hydrogels with $\phi_{PDMS,0}=0.072$. This indicated that the existence of PDMS would not significantly contribute to the stiffness of the hydrogels.

TABLE 2

Summary of the hydrogel studied, including gel fraction, polymer content in the initial and equilibrium-swollen states ($\phi_0$ and $\phi$, respectively), and equilibrium mass swelling ratio (Q)

| Sample[a] | Gel Fraction | $\phi_0$ | $\phi$ | Q |
|---|---|---|---|---|
| 100:0 PEG/PDMS | 0.92 ± 0.04 | 0.19 ± 0.01 | 0.049 ± 0.003 | 20 ± 1 |
| 70:30 PEG/PDMS | 0.88 ± 0.04 | 0.10 ± 0.04 | 0.05 ± 0.01 | 20 ± 4 |
| 50:50 PEG/PDMS | 0.89 ± 0.06 | 0.10 ± 0.06 | 0.10 ± 0.02 | 11 ± 2 |
| 30:70 PEG/PDMS | 0.89 ± 0.02 | 0.09 ± 0.01 | 0.18 ± 0.05 | 6 ± 1 |
| Gelatin[b] | — | 0.087 ± 0.003 | 0.087 ± 0.003 | 11.5 ± 0.5 |
| PAAM[b] | 0.98 ± 0.01 | 0.104 ± 0.003 | 0.104 ± 0.003 | 9.7 ± 0.3 |

Figure 3:
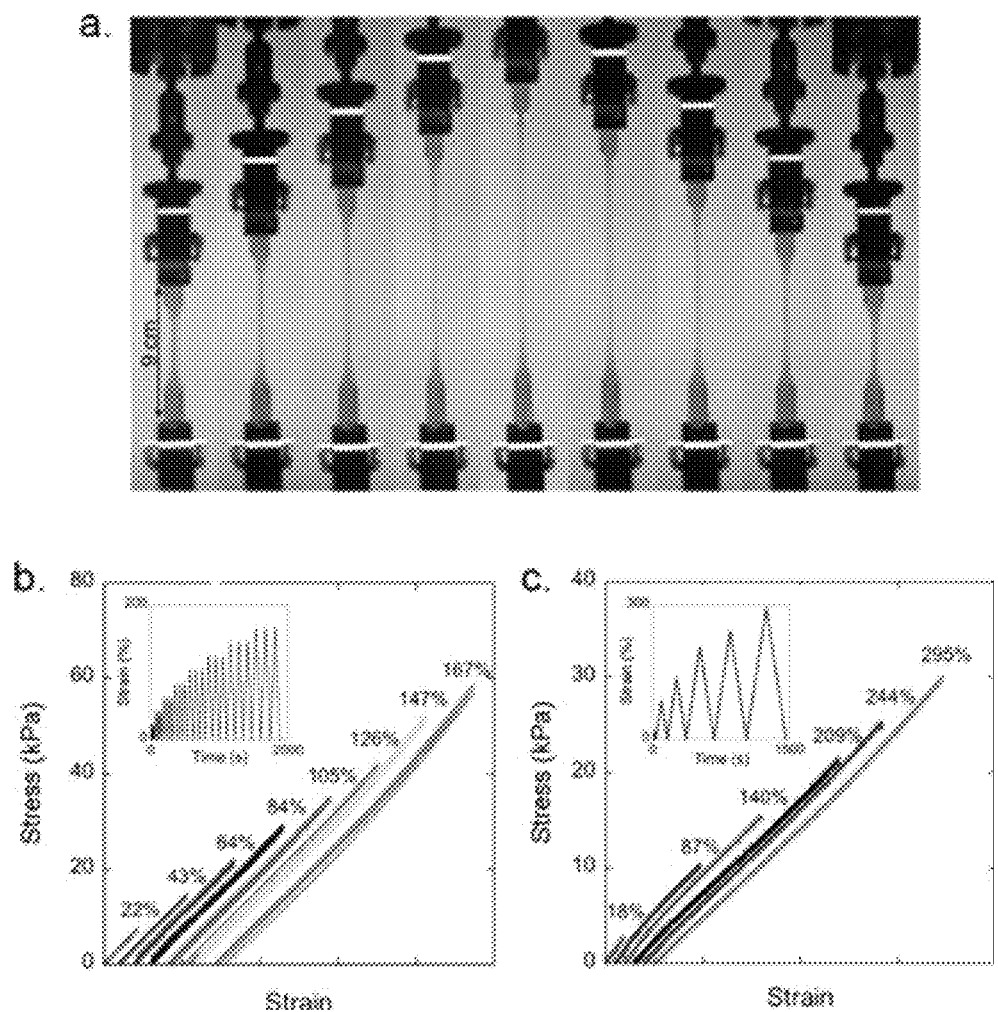
FIG. 3. (a) Photographs of a 100:0 PEG hydrogel during tensile testing over one strain cycle, reaching a maximum strain of 300%. (b,c) Representative stressstrain curves for the 30:70 and 100:0 PEG PDMS hydrogels, respectively. For clarity, the curves are shifted on the strain axis, and the final strains are given on the plots. The tick marks on the x axis represent 50% strain in b and 100% strain in c. The insets show the corresponding strain profiles as a function of time. Note in panel b that each strain % shows three cycles, demonstrating the reversibility of the stress-strain curves of these hydrogels.

[a]The PEG/PDMS samples are described by the mol ratio of PEG:PDMS
[b]The mechanical properties of the gelatin and PAAm hydrogels were measured in the initial state To investigate the resilience of the PEG and PEG/PDMS hydrogels, tensile measurements were carried out with a cyclic loading profile for two of the compositions (PEG:PDMS 100:0 and 30:70) (FIG. 3). Resilience, defined as the energy recovered after removal of the stress divided by the total energy of deformation, measures the ability of a material to deform addition, during consecutive loading cycles for each strain, the loading and unloading stress-strain curves were identical, demonstrating that there was no permanent network damage to these highly swollen, synthetic materials. These data also suggest that the Mullins effect, the stress softening phenomenon under loading, did not occur, which is commonly observed and difficult to prevent in filled rubbers and the DN hydrogels. (Mullins, et al. 1957 *Rubber Chemistry and Technology* 30, 555-571; Diani, et al. 2009 *European Polymer Journal* 45, (3), 601-612; Webber, et al. 2007 *Macromolecules* 40, (8), 2919-2927.)

Figure 4:
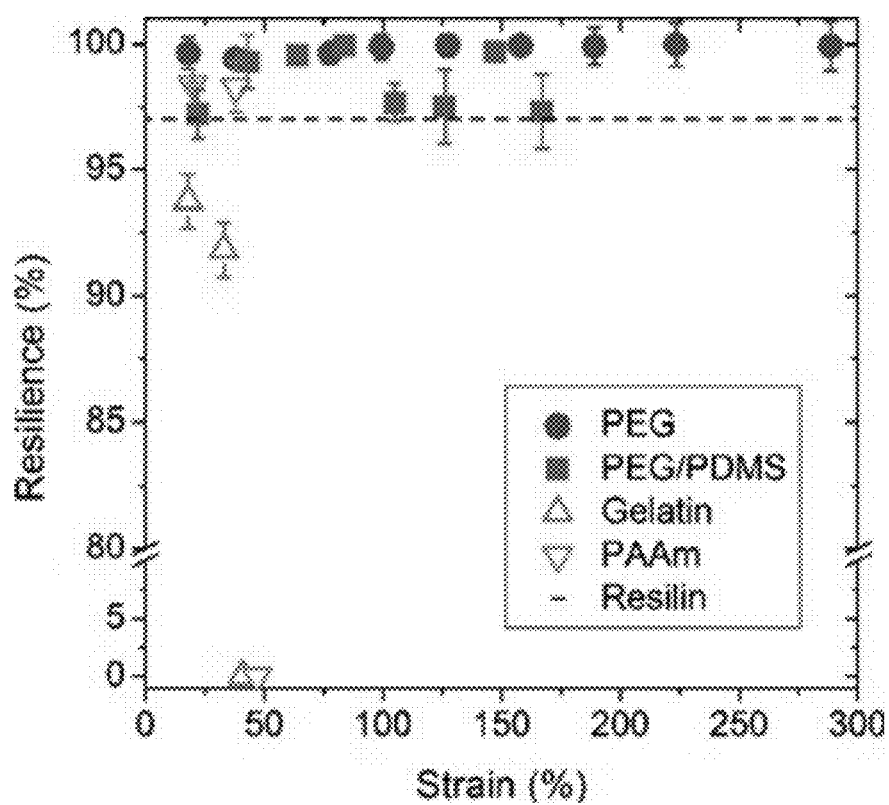
FIG. 4. Resilience as a function of strain for the 100:0 and 30:70 PEG/PDMS hydrogels, PAAm, gelatin, and resilin. The resilience was calculated from cyclic stress-strain curves in tension, and the error bars represent one standard deviation from three cycles for each measured strain. Zero resilience represents that fracture occurs at the corresponding strain. Resilin shows a high resilience at both small and large strains. (Jensen, et al. 1962 *Philosophical Transactions of the Royal Society of London Series B-Biological Sciences* 245, (721), 137-169; Elvin, et al. 2005 *Nature* 437, (7061), 999-1002.)

These studies demonstrate that the resilience of these hydrogels (≥97%) is comparable to that of the elastic proteins found in nature. Resilin, in the form of a dragonfly tendon, is reported to have a resilience of up to 97%, and elastin, a protein found in human skin and arteries, has a resilience of ~90% in the fully hydrated state. (Society for Experimental Biology (Great Britain), *The Mechanical properties of biological materials*. Published for the Society for Experimental Biology [by] Cambridge University Press: Cambridge; N.Y., 1980.) An in vitro study, however, found that the water content had a significant impact on the resilience of both native resilin and elastin. (Gosline, et al. 2002 *Philosophical Transactions of the Royal Society of London Series B-Biological Sciences* 357, (1418), 121-132.) For example, reducing the water content by as little as 5% dramatically decreased the resilience, making the proteins brittle and glassy. (Gosline 1978 *Biopolymers* 17, (3), 697-707.) In contrast, for these new hydrogels, the water content, controlled by the amount of PDMS in the hydrogels, had little influence on the resilience. As shown in FIGS. 2 and 4, both the PEG and PEG/PDMS hydrogels maintained a resilience of more than 97% across the range of measured strains (up to 300%), even though the water content varied from 95 to 82%.

Two commonly used prototypical hydrogels, with fundamentally different cross-linked network structures, were also synthesized, and their resilience was characterized for comparison. PAAm, a chemically cross-linked material, and gelatin, a physically cross-linked material, were studied (Table 2). For both hydrogels, the water content was ~90%, and the Young's modulus (in tension) was 20 kPa, which was similar to these PEG and PEG/PDMS hydrogels (16 and 34 kPa, respectively). Resilience was measured using the same cyclic loading profile, and the results are shown in the form of resilience as a function of strain in FIG. 4. At low strains (<20%), resilience of more than 90% was observed for both systems. This was expected, as resilience is typically high for all materials at small deformations. However, fracture occurred at small strains (~40%) for both the PAAm and gelatin hydrogels, demonstrating their known relatively weak and brittle mechanical performance.

Figure 5:
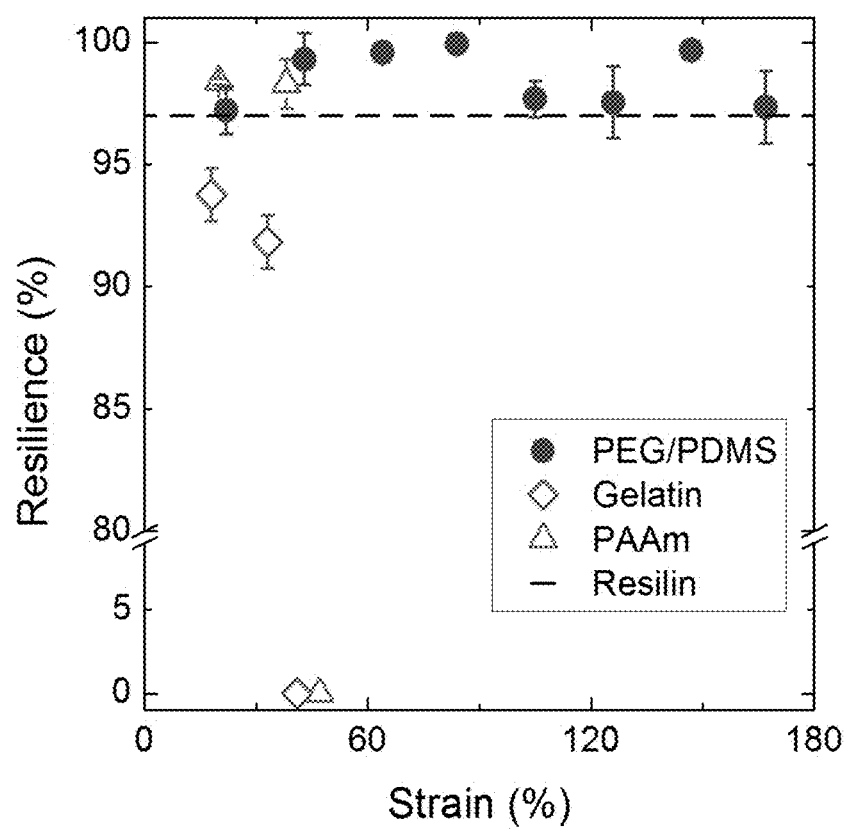
FIG. 5. Resilience as a function of strain for the 3070 PEG/PDMS hydrogels, PAAm, gelatin, and resilin. The resilience was calculated from cyclic stress-strain curves in tension, and the error bars represented one standard deviation from three cycles for each measured strain. Zero resilience represented that fracture occurs at the corresponding strain. Resilin showed a high resilience at both small and large strains. (Jensen, et al. 1962 *Philosophical Transactions of the*

Two commonly used prototypical hydrogels, with fundamentally different crosslinked network structures, were also synthesized and their resilience was characterized for comparison. Polyacrylamide (PAAm), a chemically cross-linked material, and gelatin, a physically cross-linked material, were studied. For both hydrogels, the water content was around 90%, and the Young's modulus (in tension) was approximately 20 kPa, which was similar to the PEG/PDMS hydrogels. Resilience was measured using the same cyclic loading profile, and the results are shown in the form of resilience as a function of strain in FIG. 5. At low strains (<20%), resilience of more than 90% was observed for both systems. This was expected, as resilience is typically high for all materials at small deformations. However, fracture occurred at small strains (~40%) for both the PAAm and gelatin hydrogels, demonstrating their known relatively weak and brittle mechanical performance.

As previously mentioned, DN hydrogels exhibit significant hysteresis in the first loading cycle and consequently demonstrate poor resilience. (Webber, et al. 2007 *Macromolecules* 40, (8), 2919-2927.) Furthermore, the resilience decreases with increasing strain, suggesting more permanent damage at larger strains. This is due to the permanent breakage of the covalent bonds in the randomly cross-linked PAMPS network, formed by free radical polymerization. The DN hydrogels, in addition to many other hydrogel systems in the literature, have been studied under compression, as this is easier to perform experimentally in terms of both sample preparation and testing. Therefore, to enable direct comparison, the hysteresis behavior of the PEG and PEG/PDMS hydrogels was also examined in compression. Whereas the overall swelling and moduli of these two materials were different, the resilience was greater than 90% for all of the measured strains, and the energy loss was likely due to the inevitable friction between the hydrogel and the loading plates (FIGS. 9 and 10). (Seitz, et al. 2009 *Soft Matter* 5, (2), 447-456.)

When considering the PEG and PEG/PDMS hydrogels as desirable materials, other mechanical properties in addition to resilience, such as the modulus and maximum strain, are important. The properties of several representative water-swollen materials are summarized in Table 3, including the water content ($\phi_{water}$), Young's modulus (E), maximum tensile strain ($\epsilon$max), critical strain energy release rate (Gc), and resilience at low and high strain. The PAAm, gelatin, and DN hydrogels shared the same water content ($\phi_{water}$≈0.90), which was in the range of the hydrogels reported here ($\phi_{water}$=0.82 to 0.95). The stiffness, which was characterized by the Young's modulus in tension and scales inversely with the water content, was similar among all hydrogels, whereas the stiffness of resilin and elastin is much higher due to the significantly higher protein content ($\phi_{water}$=0.40 to 0.60). Comparing the PEG and PEG/PDMS materials shows that increasing the PDMS content increased the stiffness. For maximum tensile strain and toughness (related to Gc), the PEG and PEG/PDMS hydrogels were less than those of the DN hydrogels but similar to or higher than those of the commonly used PAAm and gelatin hydrogels. Moreover, high resilience was achieved across the entire range of strains and water content for these new materials, in contrast with other purely organic hydrogels.

TABLE 3

Summary of the mechanical properties of a series of elastic materials, both synthetic and natural, including the water content ($\phi_{water}$), Young's modulus in tension (E), maximum tensile strain ($\epsilon_{max}$), critical strain energy release rate ($G_c$), and resilience at low and high degrees of strain.

| Materials | $\phi_{water}$ | E [kPa] | $\epsilon_{max}$ | $G_c$[J/m$^2$] | Resilience* [%] $\epsilon < 0.5$ | $\epsilon > 0.5$ |
|---|---|---|---|---|---|---|
| PEG | 0.95 | 16 | 3.0 | 10 | 98-99 | 99 |
| PEG/PDMS | 0.8 | 34 | 1.7 | 80 | 97 | 97 |
| PAAm | 0.9 | 29 | 0.5 | 1-10 | 98 | — |
| DN[a] | 0.9 | 100 | 10-20 | 10$^2$-10$^3$ | 77 | 40 |
| Gelatin | 0.9 | 17 | 0.4 | 2-100 | 90 | — |
| Elastin[b] | 0.4-0.45 | 1,200 | 1-2 | ND | 90 | ND |
| Resilin[c] | 0.5-0.6 | 2,000 | 1.9 | ND | 96-97 | 97 |

*The resilience data were taken from the first cycle of the stress-strain curve.
[a]Chen, et al. 2010 *Journal of the American Chemical Society* 132, (13), 4577-4579; Webber, et al. 2007 *Macromolecules* 40, (8), 2919-2927.
[b]Gosline 1978 *Biopolymers* 17, (3), 697-707; Aaron, et al. 1981 *Biopolymers* 20, (6), 1247-1260.
[c]Weis-Fogh 1961 *Journal of Molecular Biology* 3, (5), 648-667; Jensen, et al. 1962 *Philosophical Transactions of the Royal Society of London Series B-Biological Sciences* 245, (721), 137-169.

Although the underlying reasons for the extraordinary resilience of these synthetic hydrogels will require more investigation, some answers may be found in the network structure. The design strategy was based on the fundamental network elements of resilin that result in its unique elastic properties. The thiolene reaction between primary thiols and the norbornene double bond is known to be fast, highly efficient, and very selective. (Hoyle, et al. 2004 *Journal of Polymer Science Part a-Polymer Chemistry* 42, (21), 5301-5338; Fairbanks, et al. 2009 *Advanced Materials* 21, (48), 5005-5010.) This provided the hydrogels with well-defined cross-linked network structures, in which network defects, such as dangling chains and loops, were largely diminished. This is in sharp contrast with conventional radical polymerization, which is commonly used in gel synthesis. The use of telechelic polymer chains provided a precise molecular weight between cross-links, and the PEG provided an unstructured, hydrophilic chain that allowed the materials to swell significantly in water. The PDMS volume fraction controlled the overall water content of the hydrogels as $Q \sim \phi_{PDMS}^{-1.2}$.

Support for the uniform structure of these novel networks was obtained by small-angle neutron scattering (SANS). The SANS spectra show a monotonic decrease in scattering intensity over the q range of 0.005 to 0.5 Å-1 and do not display the broad peak in scattering intensity previously observed for similarly end-functionalized, yet free radically cross-linked PEG-dimethacrylate (PEGDM) hydrogels (FIG. 11). (Lin-Gibson, et al. 2005 *Macromolecules* 38, (7), 2897-2902.) Fitting these data to common models for scattering from polymer solutions and gels shows only one mesh size of 28.6±0.2 Å. (Kline, et al. 2006 *Journal of Applied Crystallography* 39, 895-900; Hammouda, et al. 2004 *Macromolecules* 37, (18), 6932-6937.) In addition, the Kratky plot shows no maximum, in contrast with the strong peak observed from the randomly cross-linked PEGDM hydrogels, illustrating that the networks reported here have an extremely homogeneous structure compared with conventional randomly cross-linked hydrogels (FIG. 12).

The neutron scattering data for the swollen PEG/PDMS hydrogels were plotted in compassion to the PEG hydrogels in FIG. 13. Compared to the homogeneous PEG hydrogel, strong scattering peaks were observed for the PEG/PDMS hydrogels. This indicated that the aggregated PDMS domains were formed in the networks. As the volume fraction of PDMS increased, the intensity of the peak significantly increased, indicating the density of the hydrophobic domains increased with the volume fraction of PDMS.

This uniform network structure is reflected in the mechanical performance of the PEG and PEG/PDMS hydrogels. During stretching of these hydrogels, the applied strain energy is distributed uniformly due to the limited number of defects, allowing the network to approach theoretical maximum strain limits. Moreover, structural defects would typically induce rearrangement of the network, resulting in irreversible energy loss during cyclic loading, especially at large strains, reflected by a decrease in resilience. However, this phenomenon was not observed in these hydrogels, which exhibited near-constant resilience until fracture (FIG. 4).

FIG. 42 showed a representative force versus displacement plot. The experiment started at the time when the probe was in contact with the sample, where the force was equal to zero. The sample was compressed with a constant velocity until the maximum force (~10 mN). The probe was then retracted with the same velocity until it was detached from the sample. During this experiment, the time, displacement, force and contact area were recorded. JKR analysis was used to determine the Young's modulus (E) and energy release rate (G). The contact area was recorded using the camera connected to the microscope, which was then used to calculate the crack propagation velocity.

To optimize the ratio for the Sylgard PDMS such that the Young's modulus is comparable to the end-linked PDMS, Sylgard PDMS with 10 to 1 and 20 to 1 weight ratios was cured and measured by dynamic mechanical analysis (DMA). FIG. 43 showed the storage modulus and loss modulus of Sylgard PDMS (10:1), Sylgard PDMS (20:1), end-linked PDMS (5 kDa), and end-linked PDMS (10 kDa) measured by DMA. The storage modulus of the end-linked PDMS networks with both two molecular weights fell in between the modulus of the Sylgard PDMS (20:1) and that of the Sylgard PDMS (10:1). A ratio between 20:1 and 10:1 would be used for the Sylgard PDMS. In this study, Sylgard PDMS networks with 18 to 1 weight ratio was chosen and compared to the endlinked PDMS networks.

Thus, in one aspect, the invention generally relates to a crosslinked block copolymer network having hydrophilic blocks and hydrophobic blocks. In certain preferred embodiments, the crosslinked block copolymer network includes hydrophilic blocks of poly(ethylene glycol) and hydrophobic blocks of polydimethylsiloxane.

In another aspect, the invention generally relates to a synthetic hydrogel, prepared by thiol-norbornene crosslink of hydrophilic poly(ethylene glycol) (PEG) and hydrophobic polydimethylsiloxane (PDMS) polymer chains, where the hydrogel is characterized by high resilience.

In yet another aspect, the invention generally relates to an article of manufacture comprising a hydrogel comprising hydrophilic blocks of poly(ethylene glycol) and hydrophobic blocks of polydimethylsiloxane.

In yet another aspect, the invention generally relates to a method for modifying the swelling and/or mechanical properties of a hydrogel of hydrophilic poly(ethylene glycol) (PEG) and hydrophobic polydimethylsiloxane (PDMS), comprising controlling the relative amounts of PEG and PDMS by adjusting the volume fractions of the PEG and/or PDMS.

In certain preferred embodiments, the hydrophilic blocks and hydrophobic blocks are crosslinked by a crosslinking agent comprising thiol moieties.

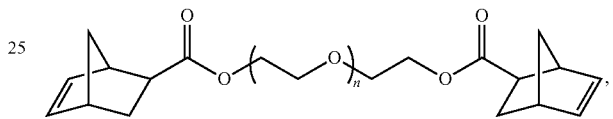

or a derivative or analog thereof, and

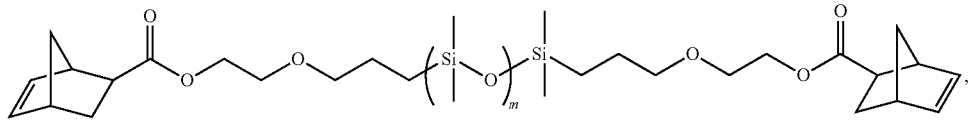

or a derivative or analog thereof, wherein each of m and n is independently an integer from about 5 to about 500 (e.g., from about 10 to about 500, from about 20 to about 500, from about 30 to about 500, from about 50 to about 500, from about 100 to about 500, from about 20 to about 400, from about 30 to about 300).

In certain preferred embodiments, the synthetic hydrogel is prepared by crosslinking of

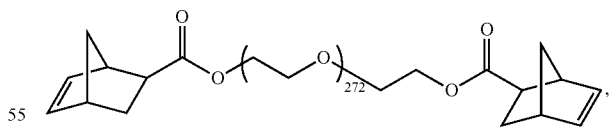

or a derivative or analog thereof, and

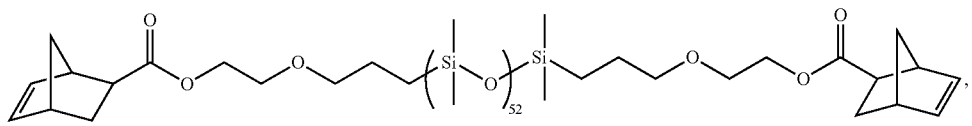

or a derivative or analog thereof.

In certain preferred embodiments, the crosslinking agent is:

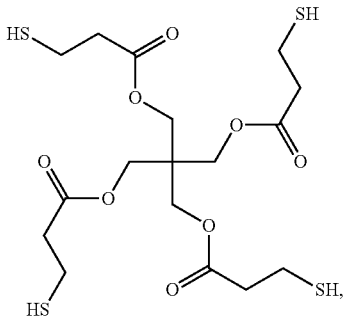 [SMILES: O=C(CCS)OCC(COC(=O)CCS)(COC(=O)CCS)COC(=O)CCS]

or a derivative or analog thereof.

In certain preferred embodiments, the hydrophilic blocks comprising from about 10 to about 1,000 units of ethylene oxide monomer. In certain preferred embodiments, the hydrophilic blocks comprising from about 5 to about 500 units of dimethylsiloxanemonomer.

In certain preferred embodiments, the hydrogel is characterized by a water content from about 50% to about 99%. In certain preferred embodiments, the hydrogel is characterized by a mechanical energy storage efficiency of greater than 97% at strains up to 300%.

Compositions and methods of the invention have broad application, for example, in biomedical field and in the design of protective wear and corrective wear (e.g., contact lens and other eye-care products).

EXAMPLES

Expressly incorporated herein for all purposes is Jun Cui, Ph. D. Dissertation "RESILIENT POLYMER NETWORKS VIA THIOL-NORBORNENE CHEMISTRY: MECHANICAL AND ADHESIVE PROPERTIES" University of Massachusetts (2012).

Materials and Instruments

Poly(ethylene glycol) (PEG) ($M_n$=12 kDa), 5-norbornene-2-carboxylic acid (99% exo), triphenylphosphine, pentaerythritol tetrakis(3-mercaptopropionate) (PETMP), hydroxyl terminated polydimethylsiloxane (PDMS) ($M_n$=4.5-5.5 kDa, 4.4 kDa according to NMR), diisopropyl azodicarboxylate (DIAD), 2-hydroxy-4'-(2-hydroxyethoxy)-2-methylpropiophenone, 30% acrylamide/N,N'-methylenebisacrylamide (29/1) precursor solution, tetramethylethylenediamine (TEMED), and ammonium peroxydisulfate (APS) were purchased from Alfa Aesar, Sigma Aldrich, Acros Organics, Gelest, or Bio-Rad Laboratories and used without further purification. Knox® gelatin was purchased from Walmart.

$_1$H NMR spectra were recorded on a Bruker DPX 300 spectrometer. Chemical shifts were expressed for deuterated chloroform as the solvent. Gel permeation chromatography (GPC) was conducted with a Polymer Laboratories PC-GPC50 with two 5 μm mixed-D columns, a 5 μm guard column, and a RI detector (HP1047A), with polystyrene standards and THF as the eluent at a flow rate of 1.0 mL/min.

Precursor Synthesis

PEG Precursor (Nor-PEG-Nor):

PEG (41 g, 3.3 mmol) was dissolved into 200 mL dichloromethane (DCM) upon heating. 5-norbornene-2-carboxylic acid (2.76 g, 20 mmol) and triphenylphosphine (5.24 g, 20 mmol) were added to the PEG solution, which was placed in an ice bath, and DIAD (4 mL, 20 mmol) was added slowly drop-wise. The mixture was stirred at room temperature for 48 hours under nitrogen, then concentrated and precipitated in cold ether three times. The white powder was obtained after drying under vacuum at room temperature, with a yield of 87%. $_1$H NMR (CDCl$_3$) δ (ppm): 6.17-6.06 (m, 4H), 4.28-4.19 (t, 4H), 3.81-3.48 (m, 1088H), 3.08-3.0 (m, 2H), 2.96-2.86 (m, 2H), 2.31-2.19 (t, 2H), 1.97-1.87 (m, 2H), 1.59-1.47 (m, 2H), 1.44-1.18 (m, 4H). GPC (THF): PDI=1.07.

PDMS Precursor (Nor-PDMS-Nor):

Hydroxyl-terminated polydimethylsiloxane (PDMS) (20 g, 4.5 mmol) was dissolved in 100 mL tetrahydrofuran (THF). 5-norbornene-2-carboxylic acid (3.7 g, 0.027 mol) and triphenylphosphine (7.1 g, 0.027 mol) were added to the PDMS solution, which was then placed in an ice bath, followed by the drop-wise addition of 5.5 mL DIAD. The reaction mixture was stirred at room temperature for 48 hours under nitrogen, then concentrated and washed with methanol three times. The transparent viscous liquid was obtained after drying under vacuum at room temperature, with a yield of 80%. $_1$H NMR (CDCl$_3$) δ (ppm): 6.19-6.08 (m, 4H), 4.29-4.23 (t, 4H), 3.69-3.62 (t, 4H), 3.50-3.40 (t, 4H), 3.09-3.05, (m, 2H), 2.97-2.91 (m, 2H), 2.33-2.25 (m, 2H), 2.00-1.91 (m, 2H), 1.70-1.52 (m, 6H), 1.43-1.33 (m, 4H), 0.60-0.48 (m, 4H), 0.23-0.00 (m, 318H). GPC (THF): PDI=1.9.

Preparation of Hydrogels

100:0 PEG Hydrogels:

the norbornene end-functionalized PEG (nor-PEG-nor, $M_n$=12 kDa) precursor (100 mg, 8 Å~10$_{-3}$ mmol), pentaerythritol tetrakis(3-mercaptopropionate) (PETMP) (2 mg, 4 Å~10$_{-3}$ mmol), and 2-hydroxy-4'-(2-hydroxyethoxy)-2-methyl-propiophenone as photoinitiator (1 mg) were dissolved in DMF (0.4 mL).

30:70 PEG/PDMS Hydrogels:

the nor-PEG-nor precursor (53.3 mg, 4.3 Å~10$_{-3}$ mmol), the norbornene end-functionalized PDMS (nor-PDMS-nor, $M_n$=4.4 kDa) precursor (46.7 mg, 10.4 Å~10$_{-3}$ mmol), PETMP (3.6 mg, 7.4 Å~10$_{-3}$ mmol), and photoinitiator (1 mg) were dissolved in THF (1 mL). The precursor solution was put into the desired mold and then exposed to ultraviolet light with a wavelength of 365 nm for 1 hour. The cross-linked gel was removed from the mold and repeatedly washed with excess DMF or THF to remove unreacted materials. Finally, the gel was immersed in excess deionized water, which was replaced daily until equilibrium swelling was reached.

Polyacrylamide (PAAm) Hydrogels:

A 10 wt % PAAm gel was prepared by redox solution polymerization via mixing a 30% precursor solution (3.3 mL), TEMED (4 μL), and 10% APS (100 μL) in distilled water (6.6 mL). The mixture was stirred for one minute and then dropped into the desired mold, which was then placed into a well-sealed desiccator filled with nitrogen. The gel was formed within thirty minutes and tested in the preparation state.

Gelatin Hydrogels:

A 10 wt % gelatin gel was made via mixing gelatin powder (0.1 g) in distilled water (0.9 mL). The powder was dissolved upon heating and then the solution was poured into the desired mold and placed in the refrigerator at 4° C. overnight to form the hydrogel. The hydrogel was tested in the preparation state.

Swelling Properties of Hydrogels

The equilibrium water content, $\phi_{water}$, was calculated by the equation $(W_{swollen}-W_{dry})/W_{swollen}$, where $W_{dry}$ is the weight of the dry network and $W_{swollen}$ is the weight of the corresponding swollen hydrogel. The equilibrium mass swelling ratio, Q, was equal to $1(1-\phi_{water})$.

Mechanical Properties of Hydrogels

Tensile Testing:

Dumbbell-shaped hydrogels were made with a customized Teflon mold, with dimensions of 63.6 mm in length, 2.7 mm in width, and 2.5 mm in thickness. The samples were gripped on an Instron, and Velcro was used to increase the friction between the hydrogels and the grips so that no slipping occurred during the measurements. A 50 N load cell was used, and samples were extended at a rate of 50 mm/min. Raw data were recorded as force versus displacement and converted to stress versus strain with respect to the initial cross-sectional area and gage length, respectively. Linear curve fitting was performed to obtain the Young's modulus, E. Integration of the stress-strain curves yielded the area under the curves, and resilience was calculated as the ratio of the area under the unloading curve to the area under the loading curve. For fracture measurements, samples with the same dimensions were used, and the size of the notch ranged from 0.1 mm to 1 mm. Fracture energy was determined by integrating the area under the stress-strain curve, and was multiplied by the initial length of the sample to calculate the critical strain energy release rate, $G_c$.

Compression Testing:

Modified syringes were used as molds to create cylindrical samples. An Instron with two parallel compression platens and either a 50 N or 1 kN load cell were used to measure the mechanical properties by compressing the hydrogels at a rate of 5 mm/min. Raw data, recorded as force versus displacement, were converted to stress versus strain with respect to the initial sample dimensions. Integration of the stress-strain curves yielded the area under the curves, and resilience was calculated as the ratio of the area under the unloading curve to the area under the loading curve for one loading cycle.

Fracture Measurements:

Rectangular hydrogel samples were made using a custom Teflon mold with a length of 3 cm and a width of 3 cm. The samples were cut in half after swelling. An arbitrary notch with a length of 1 to 2 mm was created on one edge of the sample. The sample was gripped in the Instron 4468 tensile testing instrument with a 50 N load cell. Velcro® was used to prevent slipping between the sample and the grips. The measurements were performed at an extension rate of 10 mm/min. Raw data were recorded as force versus displacement, which were then converted to stress versus strain with respect to the initial sample dimensions. Assuming a fixed displacement during crack propagation, the fracture energy was determined by the stored elastic energy, which was the area under the stress-strain curve. Then the critical strain energy release rate, $G_c$, was calculated by multiplying that area by the initial length of the sample.

The Lake-Thomas theory has been used to describe the fracture toughness of polymer networks, as $G_c$=NUf, where N is the degree of polymerization, U is the bond dissociation energy and f is the areal chain density. (Lake, et al. *Proceedings of the Royal Society of London Series a-Mathematical and Physical Sciences* 1967, 300, 108-119.) For swollen polymer networks, $f=\phi/a^2 N^{1/2}$, where a is the monomer size, derived by the scaling theory, so that $$G_c = \frac{N^{1/2} U}{a^2} \phi \qquad \text{(Equation 5)}$$

where $G_c$ is proportional to the volume fraction of the polymer ($\phi$). For the PEG hydrogel ($\phi_{PDMS,0}$=0), the theoretical $G_c$ value calculated using Equation 5 (5.3 J/m²) was comparable to the value that was determined by the fracture toughness measurement (6.9 J/m²). (Kundu, et al. 2009 *Soft Matter* 5, 3963-3968.) However, for the PEG/PDMS hydrogels, a stronger dependence of $G_c$ upon $\phi$ was observed, where $G_c$ scaled with the volume fraction of the total polymer by 1.21 (FIG. 32).

Again considering the PEG/PDMS gel as two phases (one swollen PEG phase and one PDMS phase), as can be seen in Table 5, the swollen PEG phase is the major component at small $\phi_{PDMS,0}$. Assuming the crack only propagated through the major PEG phase, the experimental $G_c$ values are plotted as a function of the volume fraction of PEG in the PEG phase, $\phi_{PEG/water}$, along with the theoretical $G_c$ values for the PEG phase according to Equation 5. As shown in FIG. 19, for the gels with small $\phi_{PEG/water}$, the experimental values were comparable with the Lake-Thomas theory's prediction. This indicated that fracture toughness of the gels was predominantly determined by the swollen PEG phase. On the other hand, at large $\phi_{PEG/water}$, the experimental values were significantly higher than the prediction. Since $\phi_{PEG/water}$ increased with $\phi_{PDMS,0}$ (FIG. 34), it is likely that the PDMS phase played an important role in the fracture toughness of the gels. For gels with large $\phi_{PDMS,0}$, assuming the crack propagated through the PDMS phase, the theoretical $G_c$ value was calculated based on the material properties of the PDMS according to Equation 5, which gave a $G_c$ of 22 J/m². This value was also significantly lower than the experimental values at large $\phi_{PDMS,0}$. This underestimation of the $G_c$ values can be attributed to two possibilities. First, the Lake-Thomas theory that was applied to describe the fracture energy of the PEG/PDMS hydrogels was limited to one phase and did not account for the combination of the strain energy stored in both the PEG and the PDMS phases. Second, the strain energy stored in the PEG/PDMS hydrogels could be non-linearly coupled with crack propagation processes in this multi-phase system, which has also not been considered. More network structure information is required to develop models that could better describe the fracture toughness of these hydrogels, and these investigations are ongoing.

The gel fraction, the weight of the dry gel after washing divided by the weight of the polymer precursor, and the swelling properties were investigated (FIG. 33). As the molecular weight of PDMS increased, the gel fraction of the hydrogel decreased from 89% to 27%. A low gel fraction indicated that the network structure was imperfect with numerous structural defects, such as loops and dangling chains. On the other hand, the equilibrium-swelling ratio in water increased with the increase of PDMS molecular weight. One possible contribution came from the imperfect networks, where the loops and dangling chains could contribute to the swelling capacity. In addition, the high molecular weight between cross-links, or the low crosslinking density, led to a large swelling ratio.

TABLE 4

Summary of the gel fraction, molecular weights between cross-links and elongation in extension for PEG/PDMS hydrogels with different compositions

| Name | Gel Fraction | [a]$M_c$ (kDa) | [b]Extension Ratio |
|---|---|---|---|
| $PEG_{100}PDMS_0$ | 0.89 ± 0.11 | 12 | 2.8 |
| $PEG_{70}PDMS_{30}$ | 0.88 ± 0.04 | 12 | 1.9 |
| $PEG_{50}PDMS_{50}$ | 0.89 ± 0.06 | 12 | 1.8 |
| $PEG_{30}PDMS_{70}$ | 0.94 ± 0.05 | 12 | 1.7 |

[a]$M_c$ stands for the molecular weight between cross-links in the hydrophilic phase of the hydrogels.
[b]Extension ratio shows the maximum extension ratio under tension.

TABLE 5

Volume fractions of PEG, PDMS, and total polymer in the preparation and equilibrium swollen (hydrated) states and equilibrium swelling ratios (Q).

| Sample | Name | Preparation state[a] | | | Hydrated state[b] | | | |
|---|---|---|---|---|---|---|---|---|
| | | $\phi_{PEG,0}$ | $\phi_{PDMS,0}$ | $\phi_0$ | $\phi_{PEG}$ | $\phi_{PDMS}$ | $\phi$ | Q |
| 1 | $PEG_{100}PDMS_0$ | 0.084 | 0 | 0.084 | 0.024 | 0 | 0.024 | 38 |
| 2 | $PEG_{70}PDMS_{30}$ | 0.069 | 0.011 | 0.080 | 0.040 | 0.007 | 0.047 | 20 |
| 3 | $PEG_{50}PDMS_{50}$ | 0.059 | 0.023 | 0.082 | 0.067 | 0.027 | 0.093 | 11 |
| 4 | $PEG_{30}PDMS_{70}$ | 0.043 | 0.041 | 0.084 | 0.091 | 0.088 | 0.18 | 5.7 |
| 5 | $PEG_{10}PDMS_{90}$ | 0.020 | 0.072 | 0.092 | 0.099 | 0.36 | 0.46 | 2.2 |

[a]In the preparation state, $\phi_o = \phi_{PEG,0} + \phi_{PDMS,0}$;
[b]in the hydrated state, $\phi = \phi_{PEG} + \phi_{PDMS}$ and $\phi + \phi_{water} = 1$. The subscripts in each sample name show the molar ratio of PEG to PDMS in the preparation state.

Young's Modulus

From the network structure aspect, the PEG/PDMS gels acted as swollen networks with nano- or micro-scale hydrophobic domains. This has some similarities to a rubber matrix filled with rigid particles, the properties of which can be described by the classic Guth-Gold model. (Guth, E. *Journal of Applied Physics* 1945, 16, 20-25.) In this model, when the volume fraction of the particles, $\phi_{particle}$, is less than 0.1, the composite modulus is related to $\phi_{particle}$ as $$E = E_0(1 + 2.5\phi_{particle} + 14.1\phi_{particle}^2) \quad \text{(Equation 2)}$$

where $E_0$ is the Young's modulus of the polymer matrix. In the PEG/PDMS hydrogel system, $\phi_{PDMS}$ is defined as $\phi_{particle}$ and $E_0$ is assumed to be the Young's modulus of the PEG gel at $\phi_{PDMS}=0$. FIG. 28 presents the experimental values of E for the PEG/PDMS hydrogels as a function of $\phi_{PDMS}$ and compares E with the theoretical prediction from the Guth-Gold model. The experimental E values were significantly larger than the predicted values. The difference was believed to result from two underlying reasons. First, the model was developed to describe systems with weak interactions between the particles and the matrix, so it did not account for the strong covalent interactions between the PDMS domains and the PEG-based network. Being covalently bonded to the matrix, the PDMS domains acted as additional cross-linking points that stiffened the hydrogels. Thus, the equation underestimated the effect of the PDMS domains on E of the hydrogels. Second, the model assumed that $E_0$ of the polymer matrix was not affected by the addition of the particles. However, in these PEG/PDMS hydrogels, since as $\phi_{PDMS,0}$ increased, Q significantly decreased (FIG. 14), E of the PEG-based matrix was expected to change with $\phi_{PDMS,0}$, according to the conventional scaling law $E \sim Q^{-2.25}$ (Obukhov, et al. 1994 *Macromolecules* 27, 3191-3198.) As a result, the difference in the experimental data and the Guth-Gold model prediction demonstrates that this PEG/PDMS hydrogel system is fundamentally different from the filled hydrogels, where the particles and matrix have weaker interactions and the addition of particles have little influence on the swelling properties. (Lin, et al. 2010 *Macromolecules* 43, 2554-2563.) Thus, a model that includes the contributions of both the hydrophobic PDMS domains and the hydrophilic PEG matrix is required.

To better capture the variation in modulus, the hydrogel can be described as two interconnected phases: one water-swollen PEG phase and one hydrophobic PDMS phase, with volume fractions $\phi_{PEG}+\phi_{water}$ and $\phi_{PDMS}$, respectively, where $\phi_{PEG}+\phi_{water},\phi_{PDMS}=1$. This assumed that water only swelled the PEG phase. The Voigt and Reuss models[46] were employed to analyze E of the hydrogels. These models were developed to describe E of composites with two components in different arrangements, providing the upper and lower limits of E for the composites. Equations 3a and 3b represent E as described by the Voigt and Reuss models, respectively, where κ is defined as $\phi_{PEG,0}/\phi_{PDMS,0}$ ($\approx \phi_{PEG}/\phi_{PDMS}$, assuming the conversions of the thiol-norbornene chemistry for the PEG and PDMS were identical), so that $E_{hydrogel}$ was dependent upon the initial volume fractions of the gels' components.

Voigt: $$E_{hydrogel} = \phi_{PDMS}\left[E_{PEG,0}\kappa^{2.25}\left(\frac{1}{1-\phi_{PDMS}}-1\right)^{1.25} + E_{PDMS,0}\right] \quad \text{(Equation 3a)}$$

Reuss: $$\frac{1}{E_{hydrogel}} = \phi_{PDMS}\left[\frac{(\phi_{PDMS}^{-1}-1)^{3.25}}{E_{PEG,0}\kappa^{2.25}} + \frac{1}{E_{PDMS,0}}\right] \quad \text{(Equation 3b)}$$

The modulus of the PDMS phase, $E_{PDMS}$, was assumed to be E of dry PDMS synthesized via the same cross-linking chemistry, $E_{PDMS,0}$, which was measured using compression testing, while the modulus of the swollen PEG phase was determined by the scaling law, as shown in Equation 4. (Obukhov, et al. 1994 *Macromolecules* 27, 3191-3198.) In this equation, $E_{PEG,0}$ was the modulus of PEG when the volume fraction of PEG was equal to one. This value was calculated based on the scaling theory, $E_{PEG,0}=E_{PEG}\phi^{-2.25}$, where $E_{PEG}$ was the modulus of equilibrium-swollen PEG when $\phi_{PDMS,0}=0$ (FIG. 16).

$$E_{PEG} \approx E_{PEG,0}(\phi_{PEG}/(\phi_{PEG}+\phi_{water}))^{2.25} = E_{PEG,0}(\kappa/(\phi_{PDMS}^{-1}))^{2.25} \quad \text{(Equation 4)}$$

To simplify this equation, $O_{PDMS}$ was empirically correlated to $\kappa$, as $\phi_{PDMS} \approx 0.078\kappa^{-1.28}$ (FIG. 29). After substituting this relationship into Equation 3, $E_{hydrogel}$ is described by $\kappa$ as shown in FIG. 18, which plots theoretical curves of E as a function of $\kappa$ predicted by the Voigt (Equation 3a) and Reuss (Equation 3b) models as well as the experimental values. The good fit to the experimental data indicates that the composite models are able to quantitatively describe the moduli of these hydrogels.

Theoretically, the Voigt and Reuss models provided the upper and lower limits of E of composites, respectively. (Young, et al. *Introduction to polymers* (2nd ed.); Chapman & Hall: New York, 1991.) In the PEG/PDMS hydrogels, the difference between the two limits provided by the Voigt and Reuss models was rather small. This difference was dependent upon E of each component in the composite, where a large difference in E would lead to a significant difference between the two limits. In this PEG/PDMS hydrogel system, E of the PDMS phase was comparable with E of the hydrated PEG phase such that the influence of the arrangement of the two phases is negligible (FIGS. 30 and 31). Therefore, both of the composite models described above were able to quantify the moduli of the PEG/PDMS hydrogels as a function of the ratio of the initial volume fractions of PEG to PDMS.

SANS Characterization

Samples for small angle neutron scattering (SANS) were prepared as described above for the 100:0 PEG hydrogels, except the final immersion and equilibration steps were performed in $D_2O$. SANS measurements were conducted on the 30 m SANS instrument at the NG-7 beamline at the National Institute for Standards and Technology (NIST) Center for Neutron Research, Gaithersburg, Md. Spectra were obtained at 25° C. in quartz sample cells with a path length of 2 mm. Spectra were collected for one hour and forty-five minutes per sample. Deuterated water was used to quantify the solvent scattering. The q-range covered in these experiments was $0.003 \text{ Å}^{-1} < q < 0.5 \text{ Å}^{-1}$. The sample-to-detector distance was 1.0 to 15.3 m, continuously variable. Data reduction and normalization were performed using standard techniques. (Kline, S. R., Reduction and analysis of SANS and USANS data using IGOR Pro. *Journal of Applied Crystallography* 2006, 39, 895-900.)

$G_c$ Calculation

The critical strain energy release rate, $G_c$, was estimated using the Lake-Thomas theory, which suggests that $G_c$ is not limited by the dissociation energy of a single bond in the backbone, but accounts for the energy stored in all of the bonds between two cross-linking points, so that $G_c \approx nUf$, where n is the degree of polymerization, U is the dissociation energy of a repeating unit, and f is the areal chain density. (Lake, et al. 1967 *Proceedings of the Royal Society of London Series a-Mathematical and Physical Sciences* 300, (1460), 108-119.) According to the scaling theory derived by Obukhov et al., we derived $f \approx \phi\, a^2\, n^{1/2}$ for a theta solvent. (Obukhov, et al. 1994 *Network Modulus and Superelasticity Macromolecules* 27, (12), 3191-3198.) By substituting that scaling relationship, we can obtain that $G_c \approx n^{1/2} U\phi/a^2$. Using that equation, the theoretical $G_c$ was calculated to be approximately 10 $J/m^2$ for the PEG hydrogels, where n=273, $U=1.6 \times 10^{-18}$ J, a=3.5 Å and $\phi$=0.04.

Small angle X-ray scattering (SAXS) patterns were obtained from a CuKα X-ray source (Osmic MaxFlux) with a wavelength of 0.154 nm (Molecular Metrology, Inc.) and a two-dimensional gas-filled wire array detector (Molecular Metrology, Inc.) at a distance of 1476 mm from the sample. The raw data were calibrated for the peak position with a silver behenate standard, which had a peak position at scattering vector, $q=1.076$ nm$^{-1}$. Two-dimensional images were reduced to the one-dimensional form using angular integration. Scattering vectors (q) were calculated from the scattering angles (θ) by the equation, $q=4\pi \sin \theta/\lambda$, and d-spacings (d) were calculated from the primary scattering peaks (q*) using $d=2\pi/q^*$.

In order to correlate the mechanical properties of the end-linked hydrogels with their chemical structures, it was necessary to characterize the nano- and micro-scaled network structure of the hydrogels by quantitative techniques. Block copolymers that were composed of PEG and PDMS blocks were known to have ordered morphology due to their chemical mismatch.[77] The PEG/PDMS hydrogels were prepared in a good solvent (THF), where the two polymers were homogeneously mixed. Upon solvent exchange the hydrophobic PDMS chains were aggregated into domains driven by their incompatibility with water. To quantify the size and the arrangement of the PDMS domains, the structure of the dry PEG/PDMS network was investigated by small angle X-ray scattering, as shown in FIG. 6.

TABLE 6

Summary of the volume fraction and d-spacing calculated from the first peak of the small angle X-ray scattering for dry gels with different compositions of PEG and PDMS.

| Sample | Dry State | | D-spacing (nm) |
| --- | --- | --- | --- |
| | $\phi_{PEG}$ | $\phi_{PDMS}$ | |
| PEG | 1 | 0 | NA |
| PEG70PDMS30 | 0.86 | 0.14 | 21 |
| PEG50PDMS50 | 0.72 | 0.28 | 24 |
| PEG30PDMS70 | 0.51 | 0.49 | 34 |
| PDMS | 0 | 1 | NA |

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A crosslinked block copolymer network comprising hydrophilic blocks and hydrophobic blocks, wherein the hydrophilic blocks comprise poly(ethylene glycol) and the hydrophobic blocks comprise polydimethylsiloxane, wherein the hydrophilic blocks and hydrophobic blocks are linked by norbornene-derived moieties.

2. The crosslinked block copolymer network of claim 1, wherein the hydrophilic blocks and hydrophobic blocks are crosslinked by a crosslinking agent comprising thiol moieties.

3. The crosslinked block copolymer network of claim 2, wherein the hydrophilic blocks comprising from about 10 to about 1,000 units of ethylene oxide monomer.

4. The crosslinked block copolymer network of claim 3, wherein the hydrophilic blocks comprising from about 5 to about 500 units of dimethylsiloxanemonomer.

5. A synthetic hydrogel, prepared by thiol-norbornene crosslinking of hydrophilic poly(ethylene glycol) (PEG) and hydrophobic polydimethylsiloxane (PDMS) polymer chains, wherein the synthetic hydrogel is characterized by a water content from about 50% to about 99% and a mechanical energy storage efficiency of greater than 97% at strains up to 300%.

6. The synthetic hydrogel of claim 5, prepared by crosslinking of

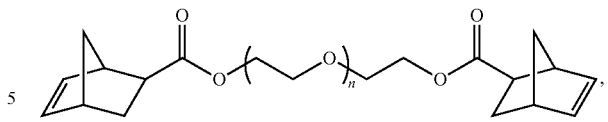

or a derivative, and

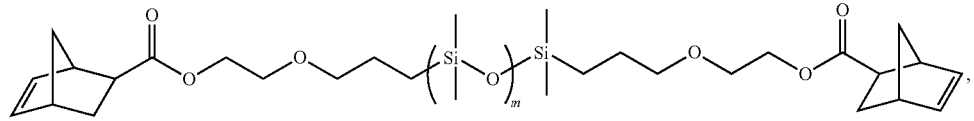

or a derivative, wherein each of m and n is independently an integer from about 5 to about 500.

7. The synthetic hydrogel of claim 5, wherein the crosslinking agent is:

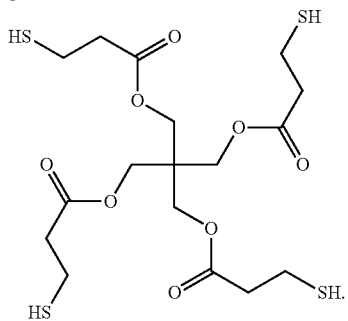

8. An article of manufacture comprising a hydrogel comprising hydrophilic blocks of poly(ethylene glycol) and hydrophobic blocks of polydimethylsiloxane, wherein the synthetic hydrogel is characterized by a water content from about 50% to about 99% and a mechanical energy storage efficiency of greater than 97% at strains up to 300%.

9. The article of manufacture of claim 8, wherein the hydrophilic blocks comprising from about 10 to about 1,000 units of ethylene oxide monomer.

10. The article of manufacture of claim 9, wherein the hydrophilic blocks comprising from about 5 to about 500 units of dimethylsiloxanemonomer.

11. The article of manufacture of claim 9, wherein the hydrogel is characterized by a water content from about 70% to about 99%.

12. The article of manufacture of claim 11, wherein the hydrogel is characterized by a water content from about 90% to about 99%.

13. A method for modifying the swelling and/or mechanical properties of a hydrogel according to claim 5, comprising controlling the relative amounts of PEG and PDMS by adjusting the volume fractions of the PEG and/or PDMS.

14. The method of claim 13, comprising increasing the volume fraction of PDMS in the hydrogel to improve the Young's modulus.

15. The method of claim 13, comprising decreasing the water content of the hydrogel to increase fracture toughness.

* * * * *